(12) United States Patent
Fujita

(10) Patent No.: US 7,751,776 B2
(45) Date of Patent: Jul. 6, 2010

(54) WIRELESS COMMUNICATION DEVICE AND METHOD FOR COMMUNICATION USING FRAME

(75) Inventor: Hiroshi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 392 days.

(21) Appl. No.: 11/826,888

(22) Filed: Jul. 19, 2007

(65) Prior Publication Data

US 2008/0045144 A1 Feb. 21, 2008

(30) Foreign Application Priority Data

Aug. 18, 2006 (JP) ............................. 2006-223520

(51) Int. Cl.
*H04B 3/36* (2006.01)
*H04B 7/14* (2006.01)
(52) U.S. Cl. ............................. 455/7; 455/11.1; 455/16; 370/315
(58) Field of Classification Search ................. 455/7, 455/456.1, 8, 509, 16, 11.1; 370/315, 330, 370/348, 218, 254, 329, 465, 338
See application file for complete search history.

(56) References Cited

U.S. PATENT DOCUMENTS

2006/0046643 A1   3/2006   Izumikawa et al.

OTHER PUBLICATIONS

First Notification of Office Action dated Feb. 5, 2010 received in corresponding Chinese Patent Application No. 200710141985.X.
IEEE C802. 16mmr-05/027r1 Recommendation on PMP Mode Compatible TDD Frame Structure (Fang-Ching Ren, Chang-Lung Hsiao, Chun-Chieh Tseng, and Wem-Ho Sheen, Nov. 15, 2005.

*Primary Examiner*—Sujatha Sharma
(74) *Attorney, Agent, or Firm*—Hanify & King, PC

(57) ABSTRACT

Wireless communication device and method whereby, even in cases where relay stations that transmit control information to terminals and relay stations that do not transmit control information coexist in the same system, the terminals are prevented from interfering with one another's communications. A non-controlling relay station transmits only data, and not control information, to a terminal, and a controlling relay station transmits both data and control information to a terminal. The wireless communication device includes a transmission interval setter for setting, in a downlink subframe of a frame for communicating by wireless with terminals, the non-controlling relay station and the controlling relay station, an interval for transmitting data from the controlling relay station to the terminal communicating therewith.

13 Claims, 20 Drawing Sheets

WIRELESS COMMUNICATION DEVICE AND METHOD FOR COMMUNICATION USING FRAME

CROSS-REFERENCE TO RELATED APPLICATIONS

This application is based upon and claims the benefits of priority from the prior Japanese Patent Application No. 2006-223520 filed on Aug. 18, 2006, the entire contents of which are incorporated herein by reference.

BACKGROUND OF THE INVENTION

1. Field of the Invention

The present invention relates to wireless communication devices and methods. More particularly, the present invention relates to a wireless communication device for performing wireless communication, a wireless communication device for relaying data exchanged between a base station and a terminal and transmitting control information to the terminal, and a wireless communication method for a wireless communication system including a base station, terminals, a non-controlling relay station for transmitting data only and a controlling relay station for transmitting both data and control information.

2. Description of the Related Art

In wireless communication systems, communication is generally carried out between a wireless base station, which is connected to a higher-level network by a wired link, and a terminal. There have also been known systems in which a relay station for relaying data by wireless is introduced between a wireless base station and a terminal. By introducing relay stations, it is possible to expand the coverage of communications and improve the communication throughput of terminals.

FIG. 18 illustrates a wireless communication system configured for wireless relay communications. As illustrated, the system includes a base station (BS) 101, a relay station (RS) 102, and a mobile station (MS) 103, which individually perform wireless communications.

For the base station 101, the relay station 102 operates as if it were a mobile station, and for the mobile station 103, the relay station 102 operates as if it were a base station. The relay station 102 receives a radio signal from the base station 101 or the mobile station 103, then performs the necessary process on the received signal, and transmits the processed signal to the mobile station 103 or the base station 101. The base station 101 and the mobile station 103 may be connected via a single relay station (single-hop connection) or two or more relay stations (multi-hop connection).

A relay communication scheme to be adopted in such a wireless communication system may be the one defined by IEEE 802.16 (WiMAX), for example, and the standardization is under way especially in 802.16j as Mobile Multihop Relay (MMR). "Relay station" is so named in 802.16j.

There are two conceivable types of communication system using relay stations.

FIG. 19 illustrates the first type of communication system. The figure shows a base station 111, a relay station 112, and mobile stations 113 and 114, together with a communication coverage area 121 of the base station 111 and a communication coverage area 122 of the relay station 112.

In the first type of communication system, the relay station 112 does not transmit control information (e.g., preamble, map information, etc.) for configuring wireless frames, and relays only data to or from the mobile station 114. This enables fast communications while restraining propagation loss.

Since the relay station 112 transmits no control information, the mobile station 114 is unaware of the presence of the relay station 112 and operates as if it were communicating directly with the base station 111. This communication system operates properly on condition that the mobile station 114 is located in an area where it can always receive control information from the base station 111.

FIG. 20 illustrates the second type of communication system. The figure shows a base station 131, a relay station 132, and a mobile station 133, along with a communication coverage area 141 of the base station 131 and a communication coverage area 142 of the relay station 132.

In the second type of communication system, the mobile station 133 may be located outside the coverage area 142 of the base station 131 (i.e., outside the area in which the mobile station 133 can receive control information from the base station 131). In this case, the relay station 132 relays data communicated between the mobile station 133, which is within the coverage area 142 of the relay station 132, and the base station 131.

Accordingly, the mobile station 133, which is located outside the area 141 of the base station 131 but within the area 142 of the relay station 132, communicates with the relay station 132 as if it were communicating with the base station 131. Thus, even though the mobile station 133 is located in an area where the control information from the base station 131 does not reach, it can communicate with the base station 131 by receiving the control information from the relay station 132.

In the above two types of communication system, relay stations are used for respective different purposes, and therefore, it is conceivable that the two different types of relay station will be used in combination. In this case, the base station needs to be configured so as to accommodate the two different types of relay station. However, such configuration has not been devised yet.

In the second type of communication system, the relay station needs to receive control information from the base station and then transmit the control information to the mobile station. However, in time-division multiplexing systems wherein data transmission and data reception cannot be carried out at the same time, the timing at which the relay station receives control information from the base station differs from the timing at which the relay station transmits the control information to the mobile station. The mobile station communicating with the relay station detects frame timing on the basis of the control information from the relay station, and therefore, the detected frame timing is different from that of the base station.

On the other hand, in the first type of communication system, the relay station itself does not transmit control information, and accordingly, the frame timing of the mobile station communicating with the relay station is identical with that of the mobile station communicating directly with the base station. Thus, the frame timing of the mobile station communicating with the relay station that transmits control information is different from the frame timing of the mobile station communicating with the relay station that does not transmit control information.

In the case of a communication system in which the two different types of relay station coexist but are serviced separately, a situation can arise where, while a mobile station communicating with the relay station that transmits control information is receiving data by using the resource specified by the relay station, a nearby mobile station communicating with the relay station that does not transmit control information transmits data with the same resource specified by the base station. In such cases, the signal transmitted from the mobile station communicating with the relay station that does not transmit control information interferes with the data reception of the mobile station communicating with the relay station that transmits control information, making the latter mobile station fail to communicate with satisfactory quality.

It is also probable that a certain relay station transmits control information during the data reception of another relay station that does not transmit control information. Generally, the control information is transmitted with high power, and thus, the relay station that does not transmit control information suffers substantial interference.

In this manner, where relay stations that transmit control information and relay stations that do not transmit control information are used in combination, an interference problem arises when multiple mobile stations simultaneously transmit and receive signals or when multiple relay stations simultaneously transmit and receive data.

SUMMARY OF THE INVENTION

The present invention was created in view of the above circumstances, and an object thereof is to provide wireless communication device and method whereby, even in cases where relay stations that transmit control information and relay stations that do not transmit control information are used in combination, terminals can be prevented from interfering with one another's communications.

To achieve the object, there is provided a wireless communication device for performing wireless communication. The wireless communication device comprises a transmission interval setter, wherein the transmission interval setter sets, in a downlink subframe of a frame for communicating by wireless with each of a terminal, a non-controlling relay station configured to transmit data only and a controlling relay station configured to transmit both data and control information, an interval for transmitting data from the controlling relay station to a terminal communicating therewith.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will be described in detail below with reference to the accompanying drawings.

Figure 1:
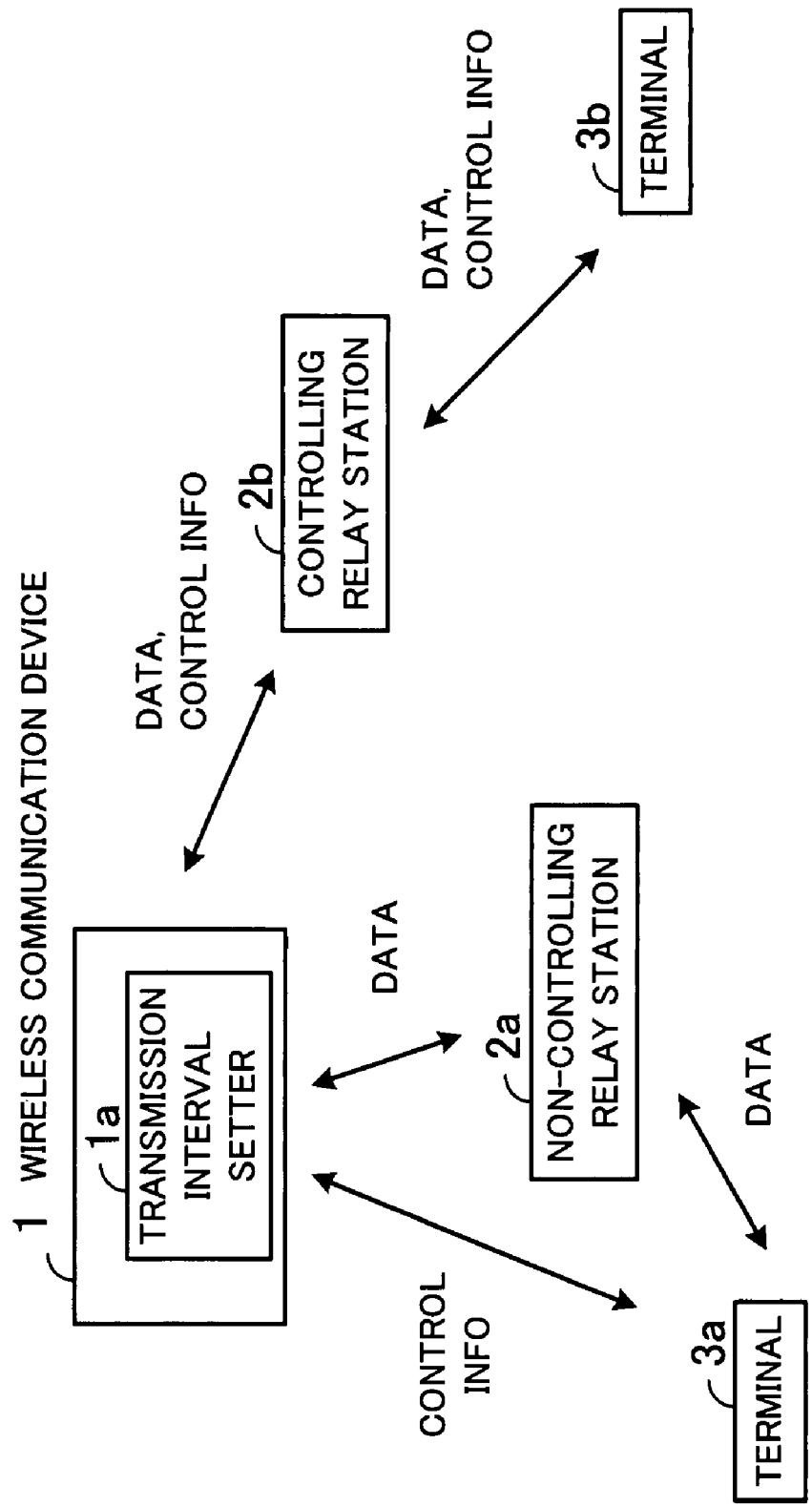
FIG. 1 schematically illustrates a wireless communication device.

FIG. 1 schematically illustrates a wireless communication device. Specifically, the figure shows the wireless communication device 1, a non-controlling relay station 2a, a controlling relay station 2b, and terminals 3a and 3b.

The non-controlling relay station 2a transmits only data to the terminal 3a and does not transmit control information including, for example, preamble and map information. On the other hand, the controlling relay station 2b transmits not only data but control information to the terminal 3b. Accordingly, the terminal 3a receives control information directly from the wireless communication device 1 but receives data via the non-controlling relay station 2a, whereas the terminal 3b receives data and control information both from the controlling relay station 2b.

The wireless communication device 1 includes a transmission interval setter 1a. The transmission interval setter 1a sets, in a downlink subframe of a frame for communicating by wireless with the terminals 3a and 3b, the non-controlling relay station 2a and the controlling relay station 2b, an interval for transmitting data from the controlling relay station 2b to the terminal 3b communicating therewith. The frame is made up of a downlink subframe and an uplink subframe.

The terminal 3a receives data via the non-controlling relay station 2a and receives control information directly from the wireless communication device 1. On the other hand, the terminal 3b receives both data and control information from the controlling relay station 2b. Consequently, the frame timing of the terminal 3a differs from that of the terminal 3b.

Thus, a situation can arise where the terminal 3a transmits data within a data transmission interval allocated in the uplink subframe while the terminal 3b is receiving data. If this occurs, interference of signals is possibly caused.

According to the present invention, the interval for transmitting data from the controlling relay station 2b to the terminal 3b communicating therewith is set in the downlink subframe of the frame by the transmission interval setter 1a, thereby eliminating the situation where, while the terminal 3b is receiving data, the terminal 3a transmits data within the data transmission interval allocated in the uplink subframe.

In this manner, the interval for transmitting data from the controlling relay station 2b to the terminal 3b communicating therewith is set in the downlink subframe of the frame. This eliminates the possibility that, while the terminal 3b communicating with the controlling relay station 2b is receiving data, the terminal 3a communicating with the non-controlling relay station 2a transmits data in the uplink subframe, thereby preventing the terminals 3a and 3b from interfering with each other. Also, the data transmission/reception of the non-controlling relay station 2a does not overlap with that of the controlling relay station 2b, thus preventing the relay stations from interfering with each other. Further, by restraining the interference, it is possible to improve throughput.

A first embodiment of the present invention will be now described in detail with reference to the drawings.

Figure 2:
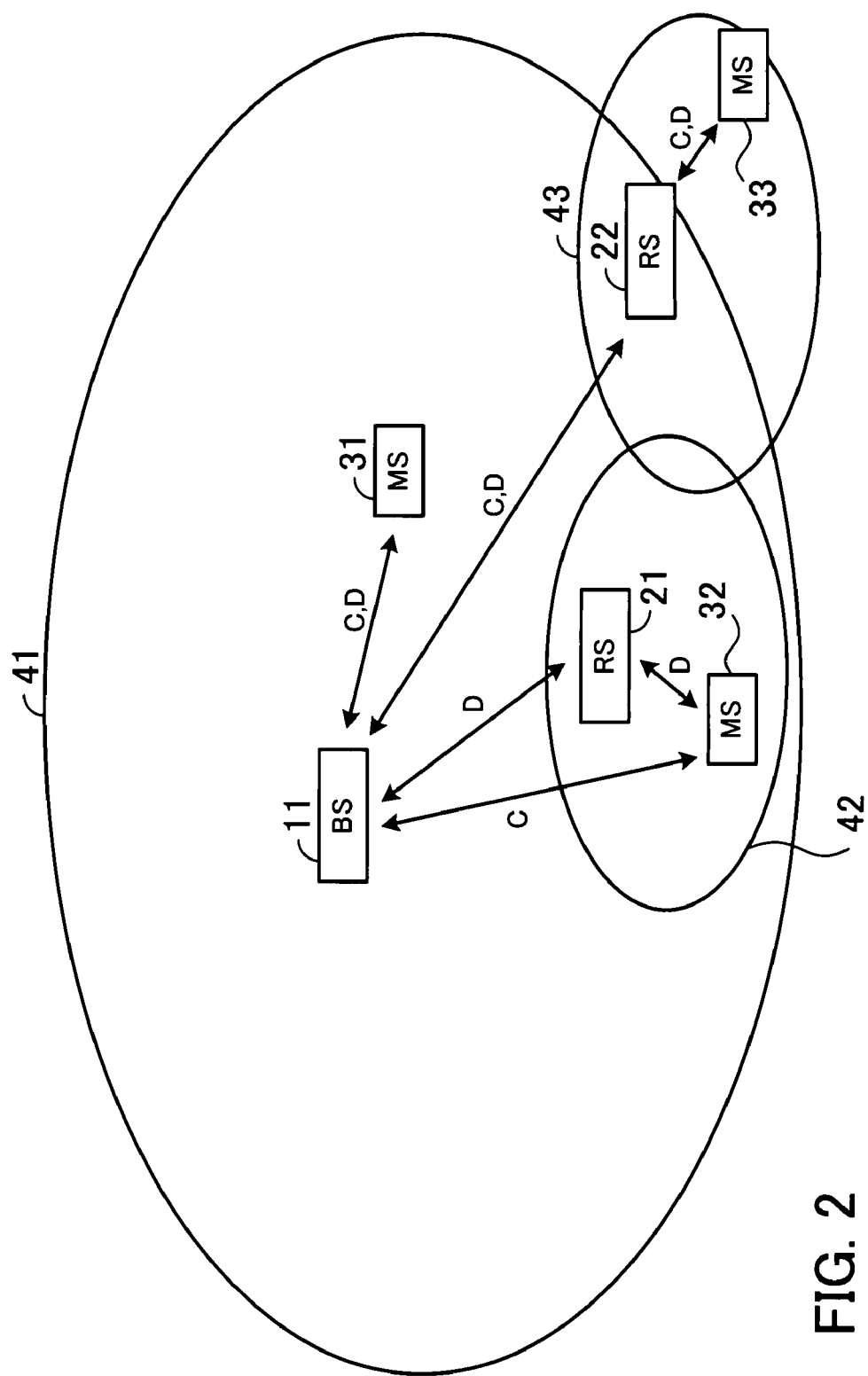
FIG. 2 shows an exemplary configuration of a communication system according to a first embodiment.

FIG. 2 shows an exemplary configuration of a communication system according to the first embodiment. Specifically, the figure shows a base station (BS) 11, relay stations (RSs) 21 and 22, and mobile stations (MSs) 31 to 33, together with a communication coverage area 41 of the base station 11, a communication coverage area 42 of the relay station 21, and a communication coverage area 43 of the relay station 22. In the figure, "C" represents control information, such as preamble and map information, exchanged between the base station 11, the relay stations 21 and 22 and the mobile stations 31 to 33, and "D" represents data exchanged between the base station 11, the relay stations 21 and 22 and the mobile stations 31 to 33.

The illustrated communication system includes both the relay station 21, which does not transmit control information, and the relay station 22, which is configured to transmit control information as well. The mobile station 31 exchanges control information and data directly with the base station 11. The mobile station 32 receives control information directly from the base station 11, but transmits/receives data to/from the base station 11 indirectly via the relay station 21. The mobile station 33, which is located outside the area 41 of the base station 11, transmits/receives data to/from the base station 11 via the relay station 22 and also receives control information from the relay station 22.

A frame which the base station 11 uses for communication is divided into a downlink (DL) subframe and an uplink (UL) subframe. The base station 11 sets the interval for transmitting control information and data from the relay station 22 to the mobile station 33 communicating therewith so that the interval may fall within the downlink subframe of the frame.

The interval for transmitting data from the mobile station 32 to the relay station 21 is set in the uplink subframe. Since the receiving operation of the mobile station 33 is set so as to take place within the downlink subframe as mentioned above, the signal transmitted from the mobile station 32 does not interfere with the data reception of the mobile station 33.

Similarly, the base station 11 sets the interval for transmitting control information and data from the mobile station 33 to the relay station 22 so that the interval may fall within the uplink subframe of the frame. Accordingly, the signal transmitted from the mobile station 33 does not interfere with the mobile station 32.

In this manner, even though the relay station 21, which does not transmit control information, and the relay station 22, which transmits control information, coexist in the same communication system, the signals of the mobile stations 31 to 33 do not interfere with one another. Also, since the relay stations 21 and 22 do not simultaneously perform data transmission and reception, their signals also do not interfere with each other.

The function of the base station 11 appearing in FIG. 2 will be now explained.

Figure 3:
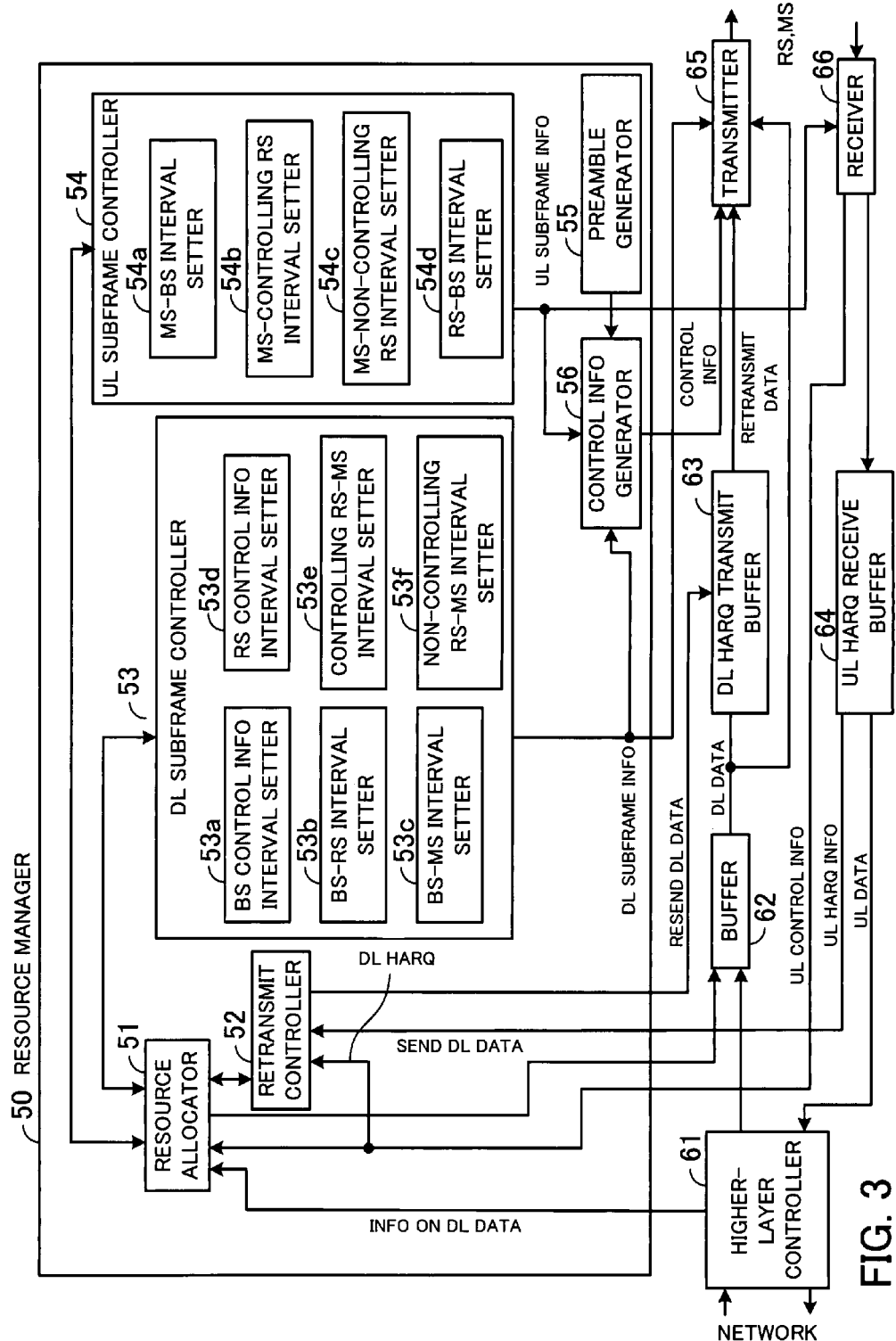
FIG. 3 is a functional block diagram of a base station.

FIG. 3 is a functional block diagram of the base station. As illustrated, the base station 11 has a resource manager 50, a higher-layer controller 61, a buffer 62, a DL HARQ (Hybrid Automatic Repeat Request) transmit buffer 63, a UL HARQ receive buffer 64, a transmitter 65, and a receiver 66.

The resource manager 50 includes a resource allocator 51, a retransmit controller 52, a DL subframe controller 53, a UL subframe controller 54, a preamble generator 55, and a control information generator 56.

The DL subframe controller 53 of the resource manager 50 includes a BS control information transmission interval setter 53a, a BS-RS downlink transmission interval setter 53b, a BS-MS downlink transmission interval setter 53c, an RS control information transmission interval setter 53d, a controlling RS-MS downlink transmission interval setter 53e, and a non-controlling RS-MS downlink transmission interval setter 53f.

The UL subframe controller 54 of the resource manager 50 includes an MS-BS uplink transmission interval setter 54a, an MS-controlling RS uplink transmission interval setter 54b, an MS-non-controlling RS uplink transmission interval setter 54c, and an RS-BS uplink transmission interval setter 54d.

The base station 11 performs downlink data transmission in the manner described below. Downlink data is received from a network via the higher-layer controller 61. The received data is once stored in the buffer 62, and information about the received data is sent to the resource manager 50.

In the resource manager 50, the resource allocator 51, the DL subframe controller 53 and the UL subframe controller 54 set a frame format and determine data to be transmitted.

The retransmit controller 52 takes care of the control of downlink/uplink ARQ (Automatic Repeat Request) and HARQ as well as the creation and retransmission of ACK/NACK. The individual setters in the DL and UL subframe controllers 53 and 54 cooperate with the resource allocator 51 to allocate available resources to respective intervals.

The BS control information transmission interval setter 53a in the DL subframe controller 53 sets an interval for broadcasting control information from the base station 11 to the relay stations 21 and 22 and the mobile stations 31 to 33 communicating therewith.

The interval represents herein the frame start time, an offset from the frame start time, and a transmission period. Namely, the individual setters allocate their respective intervals within the frame format. For example, as explained later with reference to FIG. 8, the BS control information transmission interval setter 53a sets the control information broadcasting interval (corresponding to period D1 in FIG. 8) at the beginning of the frame.

The BS-RS downlink transmission interval setter 53b sets an interval for transmitting data from the base station 11 to the relay stations 21 and 22 communicating therewith.

The BS-MS downlink transmission interval setter 53c sets an interval for transmitting data from the base station 11 to the mobile station 31 communicating therewith.

The RS control information transmission interval setter 53d sets an interval for broadcasting control information from the controlling relay station 22, which is configured to transmit control information, to the mobile station 33 communicating therewith.

The controlling RS-MS downlink transmission interval setter 53e sets an interval for transmitting data from the controlling relay station 22 to the mobile station 33 communicating therewith.

The non-controlling RS-MS downlink transmission interval setter 53f sets an interval for transmitting data from the non-controlling relay station 21, which does not transmit control information, to the mobile station 32 communicating therewith.

The MS-BS uplink transmission interval setter 54a of the UL subframe controller 54 sets an interval for transmitting data from the mobile station 31 to the base station 11.

The MS-controlling RS uplink transmission interval setter 54b sets an interval for transmitting data from the mobile station 33 to the controlling relay station 22.

The MS-non-controlling RS uplink transmission interval setter 54c sets an interval for transmitting data from the mobile station 32 to the non-controlling relay station 21.

The RS-BS uplink transmission interval setter 54d sets an interval for transmitting data from the relay stations 21 and 22 to the base station 11.

The frame format determined by the DL and UL subframe controllers 53 and 54 is finalized as control information by the control information generator 56 and then transmitted during the base station control information broadcasting internal (e.g., period D1 in FIG. 8) from the transmitter 65. The relay stations 21 and 22 and the mobile stations 31 to 33, which are supplied with the control information, transmit and receive data in their respective intervals specified by the control information. The control information also includes preamble generated by the preamble generator 55 to notify the recipients of the frame timing.

Downlink data that is be transmitted under the instruction of the resource allocator 51 is fetched from the buffer 62 and then transmitted from the transmitter 65. Downlink HARQ retransmit data of the base station 11 that is to be transmitted under the instruction of the retransmit controller 52 is fetched from the DL HARQ transmit buffer 63 and then transmitted from the transmitter 65.

Figure 8:
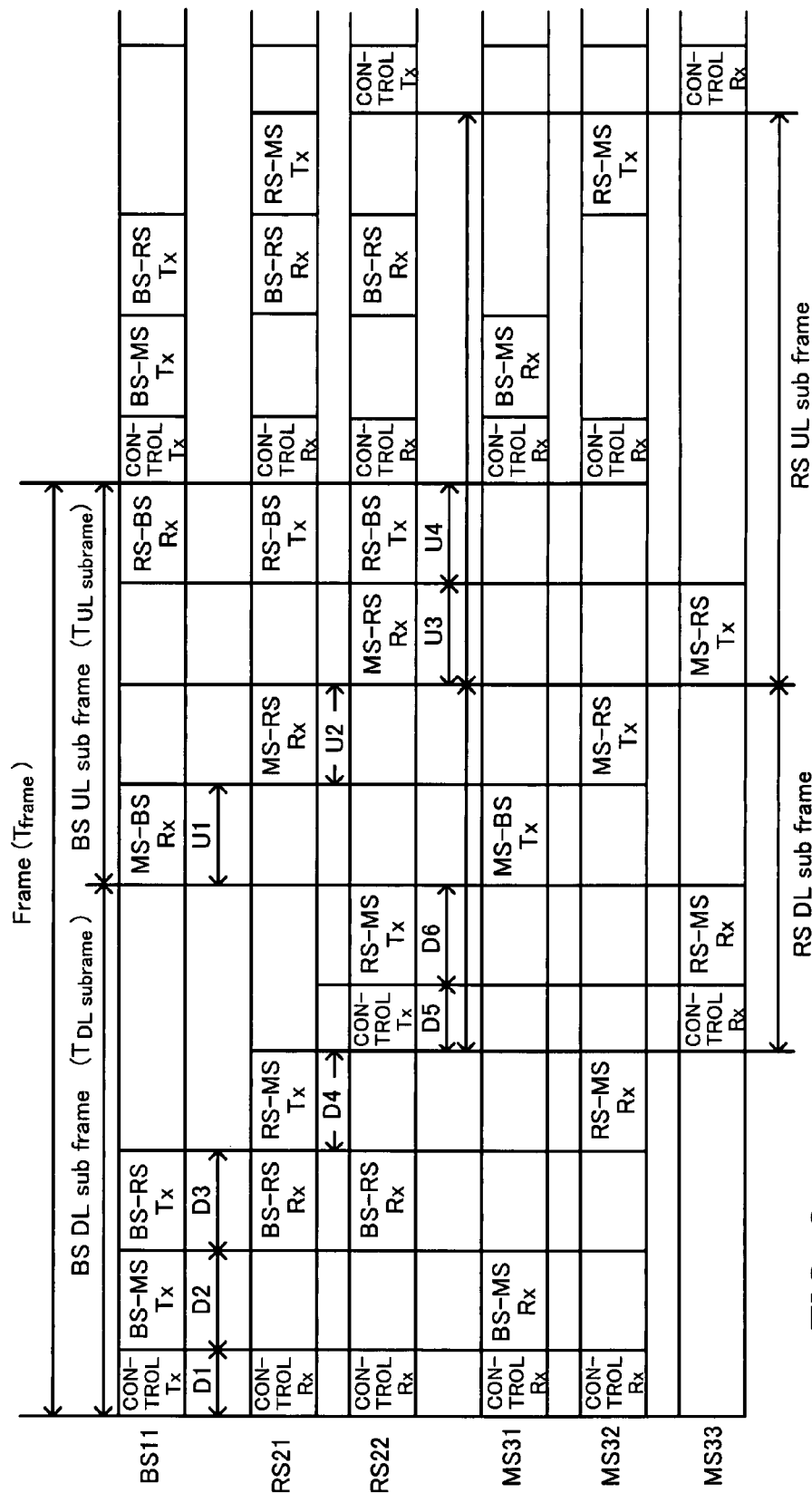
FIG. 8 illustrates a frame format.

Data for the relay stations 21 and 22 is transmitted during the BS-RS downlink transmission interval (e.g., period D3 in FIG. 8), and data for the mobile station 31 is transmitted during the BS-MS downlink transmission interval (e.g., period D2 in FIG. 8).

The base station 11 receives uplink data in the manner described below. The receiver 66 receives an uplink signal from the mobile station 31 during the MS-BS uplink transmission interval (e.g., period U1 in FIG. 8), and receives uplink signals from the relay stations during the RS-BS uplink transmission interval (e.g., period U4 in FIG. 8).

Among the received signals, uplink user data is sent to the higher-layer controller 61 to be transmitted to the network, and uplink control information is sent to the resource allocator 51. The uplink control information includes information about the qualities of uplink and downlink propagation paths, bandwidth request, etc., and based on the information, the resource allocator 51 and the DL and UL subframe controllers 53 and 54 determine the individual transmission intervals. ACK/NACK responsive to downlink HARQ data is sent to the retransmit controller 52.

The following describes an exemplary data structure of the control information transmitted from the base station 11.

Figure 4:
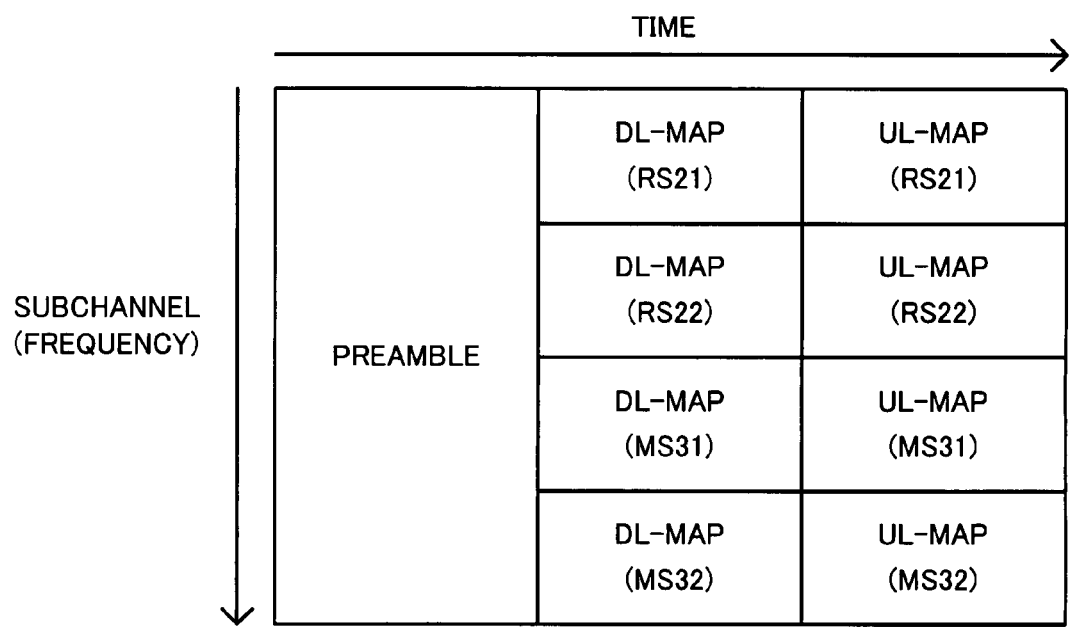
FIG. 4 shows an exemplary data structure of control information.

FIG. 4 exemplifies the data structure of the control information. The control information transmitted from the base station 11 to the relay stations 21 and 22 and the mobile stations 31 and 32 includes preamble information and map information arrayed in the direction of time as well as in the direction of subchannel, as shown in the figure. Each map specifies the transmission/reception time and the transmission/reception period. On receiving the control information, each of the relay stations 21 and 22 and the mobile stations 31 and 32 recognizes the transmission and reception intervals available thereto, based on the corresponding maps in the received control information, and transmits and receives signals during the respective intervals.

The control information transmitted from the relay station 22 to the mobile station 33 will be now described.

Figure 5:
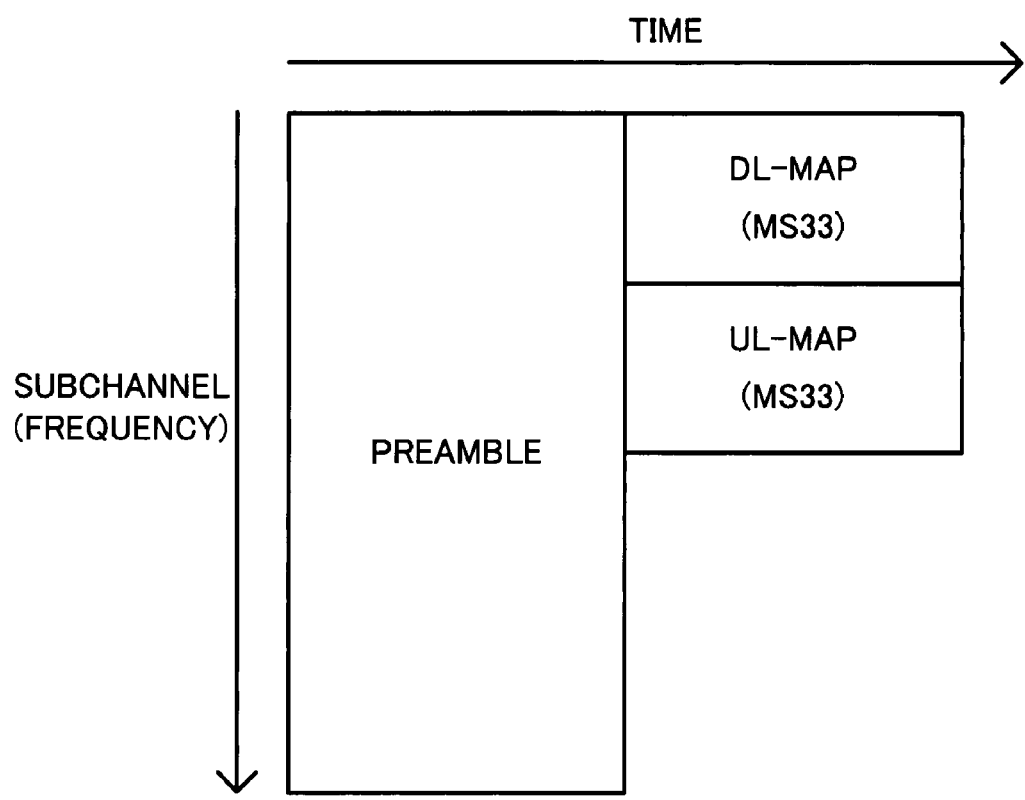
FIG. 5 shows an exemplary data structure of control information transmitted from a relay station.

FIG. 5 shows an exemplary data structure of the control information transmitted from the relay station. The control information transmitted from the relay station 22 to the mobile station 33 includes preamble information and map information arrayed in the direction of time as well as in the direction of subchannel, as shown in the figure. Each map specifies the transmission/reception time and the transmission/reception period. On receiving the control information, the mobile station 33 recognizes the transmission and reception intervals available thereto, based on the respective maps in the received control information, and transmits and receives signals during the respective intervals. The control information shown in FIG. 5 is created by the relay station 22 on the basis of the control information received from the base station 11.

The following describes the manner of setting the downlink subframe.

Figure 6:
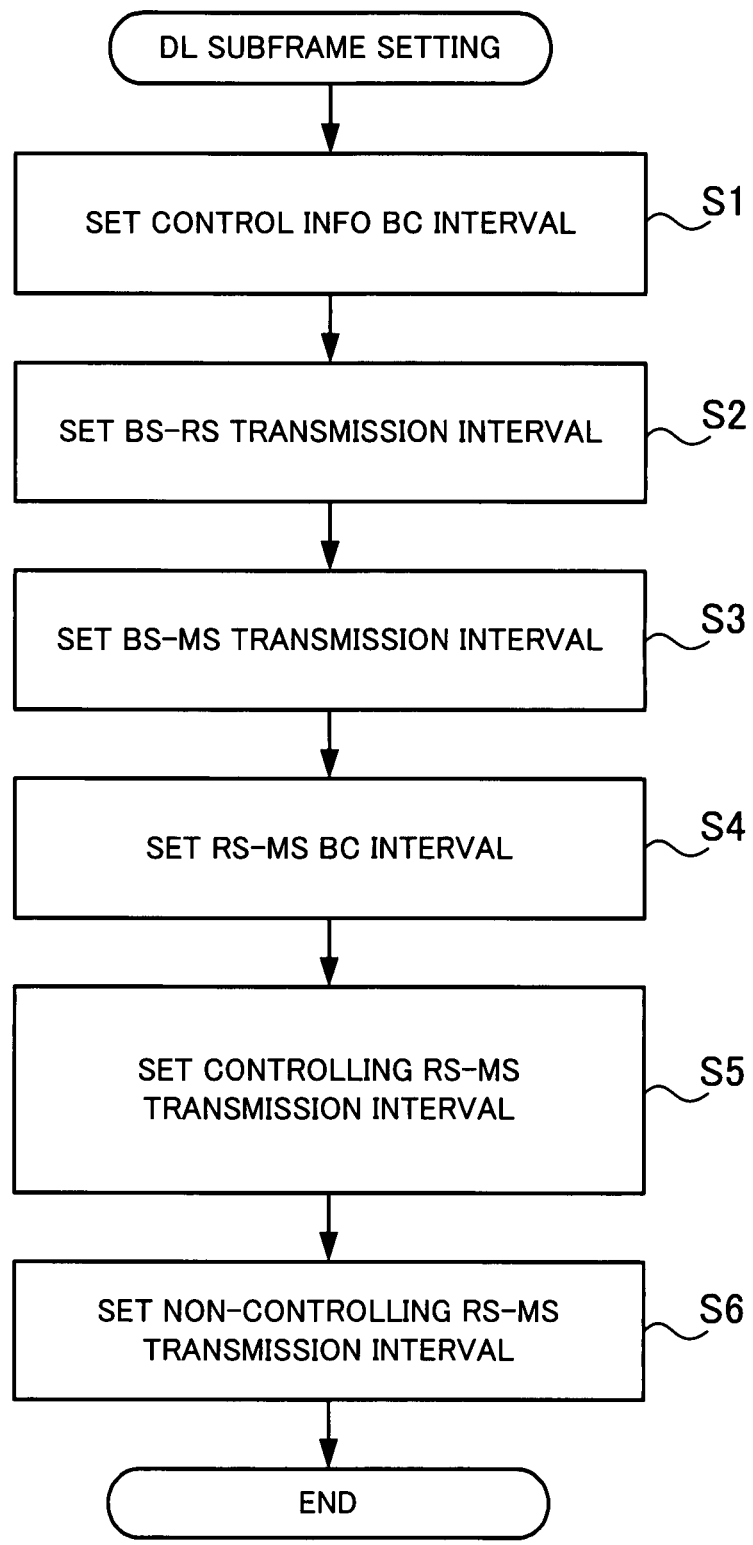
FIG. 6 illustrates the flow of setting a downlink (DL) subframe.

FIG. 6 illustrates the flow of setting the downlink subframe. The downlink subframe has six intervals set by the steps explained below.

Step S1: The base station 11 sets an interval for broadcasting (in FIG. 6, "BC") control information therefrom to the relay stations 21 and 22 and the mobile stations 31 and 32. In order to enter the network, the relay stations 21 and 22 and the mobile stations 31 and 32 receive the control information from the base station 11 and detect the frame timing. Accordingly, the control information needs to be transmitted at the beginning of the frame.

Step S2: The base station 11 sets an interval for transmitting data therefrom to the relay stations 21 and 22.

Step S3: The base station 11 sets an interval for transmitting data therefrom to the mobile station 31 which is communicating directly with the base station 11.

Step S4: The base station 11 sets an interval for broadcasting control information from the controlling relay station 22 to the mobile station 33 communicating therewith. On receiving the control information from the relay station 22, the mobile station 33 recognizes the time of reception of the control information as the beginning of the frame, thereby detecting the frame timing.

Step S5: The base station 11 sets an interval for transmitting data from the controlling relay station 22 to the mobile station 33 communicating therewith.

The mobile station 33, which communicates with the controlling relay station 22, is operating with frame timing different from that transmitted from the base station 11. The mobile stations 31 and 32, which communicate with the base station 11, transmit data during the uplink subframe period of the base station 11, and if during this period, the mobile station 33 communicating with the relay station 22 is receiving data in the separately set downlink subframe, the signals transmitted from the mobile stations 31 and 32 interfere with the operation of the mobile station 33.

Thus, to eliminate such interference between the mobile station 31, 32 and the mobile station 33 operating with different frame timings, the base station 11 sets the period of data reception of the mobile station 33 so as to fall within the downlink subframe period of the base station 11.

Also, the transmission interval is set such that data is transmitted to the mobile station 33 immediately after the control information is transmitted. This is because the mobile station 33 is not aware of the frame timing until it is supplied with the control information. Also, the transmission interval is set at that timing in order to keep the mobile station 33 receiving data.

Step S6: The base station 11 sets an interval for transmitting data from the non-controlling relay station 21 to the mobile station 32 communicating therewith.

The intervals set in the aforementioned steps, except the one set in Step S1, may appear in any order within the downlink subframe.

The manner of setting the uplink subframe will be now described.

Figure 7:
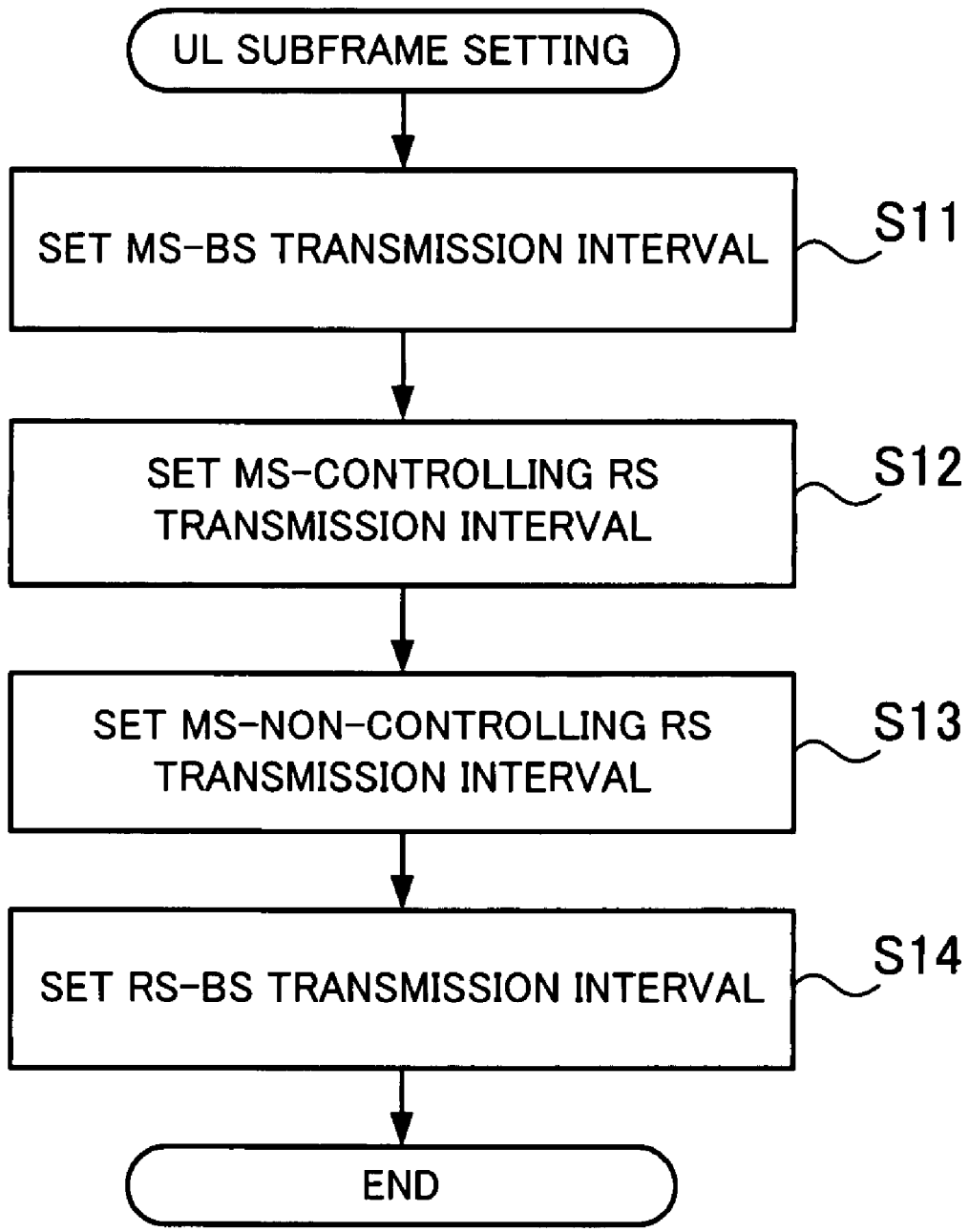
FIG. 7 illustrates the flow of setting an uplink (UL) subframe.

FIG. 7 illustrates the flow of setting the uplink subframe. The uplink subframe has four intervals set by the steps explained below.

Step S11: The base station 11 sets an interval for transmitting data from the mobile station 31 to the base station 11.

Step S12: The base station 11 sets an interval for transmitting data from the mobile station 33 to the controlling relay station 22.

The frame timing of the mobile station 33 communicating with the controlling relay station 22 is different from that of the base station 11. Thus, if the interval for transmitting data from the mobile station 33 to the controlling relay station 22 overlaps with the downlink subframe period of the base station 11, the signal transmitted from the mobile station 33 interferes with the receiving operation of the mobile station 31 communicating with the base station 11 or the receiving operation of the mobile station 32 communicating with the non-controlling relay station 21.

To avoid such interference, the base station 11 sets the data transmission interval for the mobile station 33 communicating with the relay station 22 so as to fall within the uplink subframe period of the base station 11.

Step S13: The base station 11 sets an interval for transmitting data from the mobile station 32 to the non-controlling relay station 21.

Step S14: The base station 11 sets an interval for transmitting data from the relay stations 21 and 22 to the base station 11.

The intervals set in the aforementioned steps may appear in any order within the uplink subframe. The downlink subframe, however, should precede the uplink subframe. This is because the control information in the downlink subframe carries information about the format of the entire frame and is used by the relay stations 21 and 22 and the mobile stations 31 and 32 to transmit and receive data.

The following describes the frame made up of the aforementioned intervals.

FIG. 8 shows the format of the frame. As illustrated, the control information is broadcast at time 0 (at the beginning of the frame) from the base station 11 and received by the relay stations 21 and 22 and the mobile stations 31 and 32.

According to IEEE 802.16e, preamble and map information are transmitted as the control information. The transmission intervals defined as above are included in the map information as explained above with reference to FIG. 4. On receiving the control information, the relay stations 21 and 22 and the mobile stations 31 and 32 individually recognize the transmission and reception intervals available thereto on the basis of the map information.

During the period D2 after a lapse of the control information broadcasting period D1, data is transmitted from the base station 11 to the mobile station 31.

Then, during the period D3 subsequent to the period (D1+D2), data is transmitted from the base station 11 to the relay stations 21 and 22. At this time, the data transmission to the relay stations 21 and 22 may be implemented using any of time-division multiplexing, subchannel-division multiplexing, code-division multiplexing and space-division multiplexing; however, it is necessary that the signals should be separable at the relay stations 21 and 22.

Subsequently, during the period D4 succeeding the period (D1+D2+D3), data is transmitted from the relay station 21 to the mobile station 32. Since the relay station 21 does not transmit control information, the relay station 21 and the mobile station 32 are previously notified by the control information from the base station 11 that data is to be transmitted from the relay station 21 to the mobile station 32 during this period.

During the period D5 subsequent to the period (D1+D2+D3+D4), control information is broadcast from the relay station 22. In systems based on IEEE 802.16e (e.g., in IEEE 802.16j systems), the above-defined transmission and reception intervals of the mobile station 33 are included in the map information, as explained above with reference to FIG. 5. On receiving the control information from the relay station 22, the mobile station 33 recognizes the frame timing of the relay station 22. Also, after connected to the relay station 22, the mobile station 33 learns the transmission/reception timing and period from the control information supplied from the relay station 22.

Then, during the period D6 subsequent to the period (D1+D2+D3+D4+D5), data is transmitted from the relay station 22 to the mobile station 33. On completion of the data transmission, the downlink subframe ends and the uplink subframe starts according to the frame timing of the base station 11.

The relay stations 21 and 22 and the mobile stations 31 and 32 are previously notified of the uplink subframe start timing by means of the control information from the base station 11, and transmit data to the base station 11 or the relay station 21, 22 on the basis of the uplink subframe start timing and the respective transmission timings and periods specified by the control information from the base station 11. Let the downlink subframe period of the base station 11 be $T_{DLsubframe}$. During the period U1 after a lapse of the period $T_{DLsubframe}$, data is transmitted from the mobile station 31 to the base station 11.

Then, during the period U2 subsequent to the period ($T_{DLsubframe}$+U1), data is transmitted from the mobile station 32 to the relay station 21.

Subsequently, during the period U3 succeeding the period ($T_{DLsubframe}$+U1+U2), data is transmitted from the mobile station 33 to the relay station 22. The transmission interval of the mobile station 33 communicating with the controlling relay station 22 is specified by the control information received from the relay station 22.

During the period U4 subsequent to the period ($T_{DLsubframe}$+U1+U2+U3), data is transmitted from the relay stations 21 and 22 to the base station 11. At this time, the data transmission from the relay stations 21 and 22 to the base station 11 may be implemented by any of time-division multiplexing, subchannel-division multiplexing, code-division multiplexing and space-division multiplexing; however, it is necessary that the signals should be separable at the base station 11. The process described above completes the data transmission and reception corresponding to one frame.

In this manner, the interval for transmitting data from the relay station 22 to the mobile station 33 communicating therewith is set within the downlink subframe. Also, the interval for transmitting data from the mobile station 33 to the relay station 22 is set within the uplink subframe. Accordingly, even though the non-controlling relay station 21 and the controlling relay station 22 coexist in the same communication system, the signals of the mobile stations 31 to 33 do not interfere with one another. Also, since the situation where the relay stations 21 and 22 simultaneously transmit and receive data does not occur, the signals of the relay stations 21 and 22 do not interfere with each other. Further, because of the elimination of signal interference, communication throughput improves.

In the above description, the intervals for transmitting control information and data are set by the base station 11 so as to fall within the downlink subframe, but this setting may alternatively be made by the controlling relay station 22. In this case, the relay station 22 itself sets the intervals for transmitting control information and data to the mobile station 33 such that the intervals fall within the downlink subframe period of the base station 11. In FIG. 8, for example, the relay station 22 sets the periods D5 and D6 so as to fall within the downlink subframe period of the base station 11.

Also, in the foregoing description, the interval for transmitting data from the mobile station 33 to the relay station 22 is set by the base station 11 so as to fall within the uplink subframe, but this setting may alternatively be made by the controlling relay station 22. In this case, the relay station 22 itself sets the interval for transmitting data from the mobile station 33 to the relay station 22 such that the interval falls within the uplink subframe period of the base station 11. In FIG. 8, for example, the relay station 22 sets the period U3 so as to fall within the uplink subframe period of the base station 11.

A second embodiment of the present invention will be now described in detail with reference to the drawings. Relay stations require a certain period of time to switch between transmission and reception modes and are unable to transmit or receive data during the switching time. In the second embodiment, therefore, the number of times the relay stations are switched between the transmission and reception modes is reduced. Also, sufficient time is provided for the switching of a relay station to allow other relay station to transmit or receive data and also to prevent the transmitting or receiving operation from being delayed by the switching. In the following, explanation will be made with reference to the communication system shown in FIG. 2.

Figure 9:
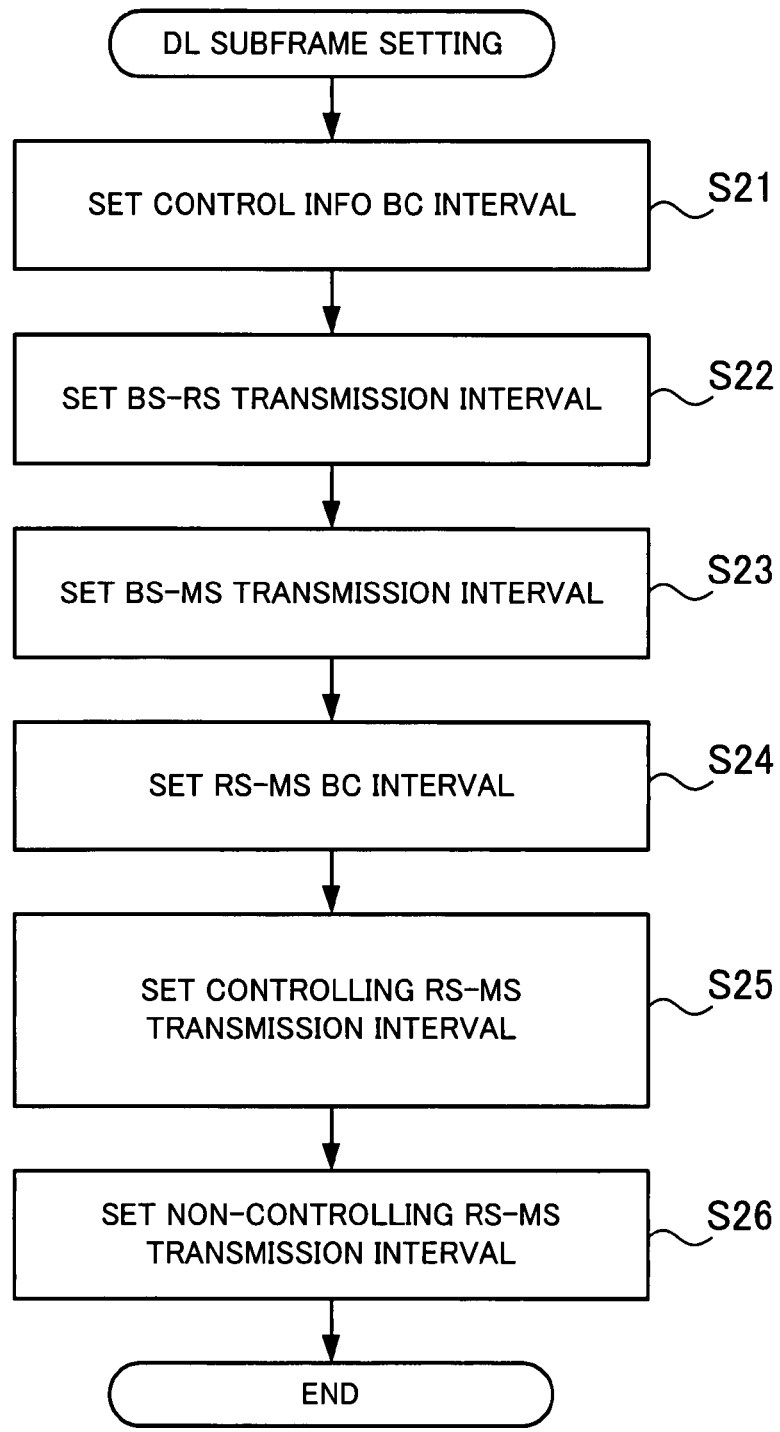
FIG. 9 illustrates the flow of setting a downlink subframe according to a second embodiment.

FIG. 9 illustrates the flow of setting the downlink subframe according to the second embodiment. The downlink subframe has six intervals set by the steps explained below.

Step S21: The base station 11 sets an interval for broadcasting (in FIG. 9, "BC") control information to the relay stations 21 and 22 and the mobile stations 31 and 32. In order to enter the network, the relay stations 21 and 22 and the mobile stations 31 and 32 receive the control information from the base station 11 and detect the frame timing. Accordingly, the control information needs to be transmitted at the beginning of the frame.

Step S22: The base station 11 sets an interval for transmitting data to the relay stations 21 and 22.

Step S23: The base station 11 sets an interval for transmitting data to the mobile station 31 communicating directly therewith.

Step S24: The base station 11 sets an interval for broadcasting control information from the controlling relay station 22 to the mobile station 33 communicating therewith. On receiving the control information from the relay station 22, the mobile station 33 recognizes the time of reception of the control information as the beginning of the frame, thereby detecting the frame timing.

Step S25: The base station 11 sets an interval for transmitting data from the controlling relay station 22 to the mobile station 33 communicating therewith.

The mobile station 33, which communicates with the controlling relay station 22, is operating with frame timing different from that transmitted from the base station 11. The mobile stations 31 and 32, which communicate with the base station 11, transmit data during the uplink subframe period of the base station 11, and if during this period, the mobile station 33 communicating with the relay station 22 is receiving data in the separately set downlink subframe, the signals transmitted from the mobile stations 31 and 32 interfere with the operation of the mobile station 33.

Thus, to eliminate such interference between the mobile station 31, 32 and the mobile station 33 operating with different frame timings, the base station 11 sets the period of data reception of the mobile station 33 so as to fall within the downlink subframe period of the base station 11.

Also, the transmission interval is set such that data is transmitted to the mobile station 33 immediately after the control information is transmitted. This is because the mobile station 33 is not aware of the frame timing until it is supplied with the control information. Also, the transmission interval is set at that timing in order to keep the mobile station 33 receiving data.

Step S26: The base station 11 sets an interval for transmitting data from the non-controlling relay station 21 to the mobile station 32 communicating therewith.

The intervals set in the aforementioned steps should appear in the mentioned order within the downlink subframe.

Figure 10:
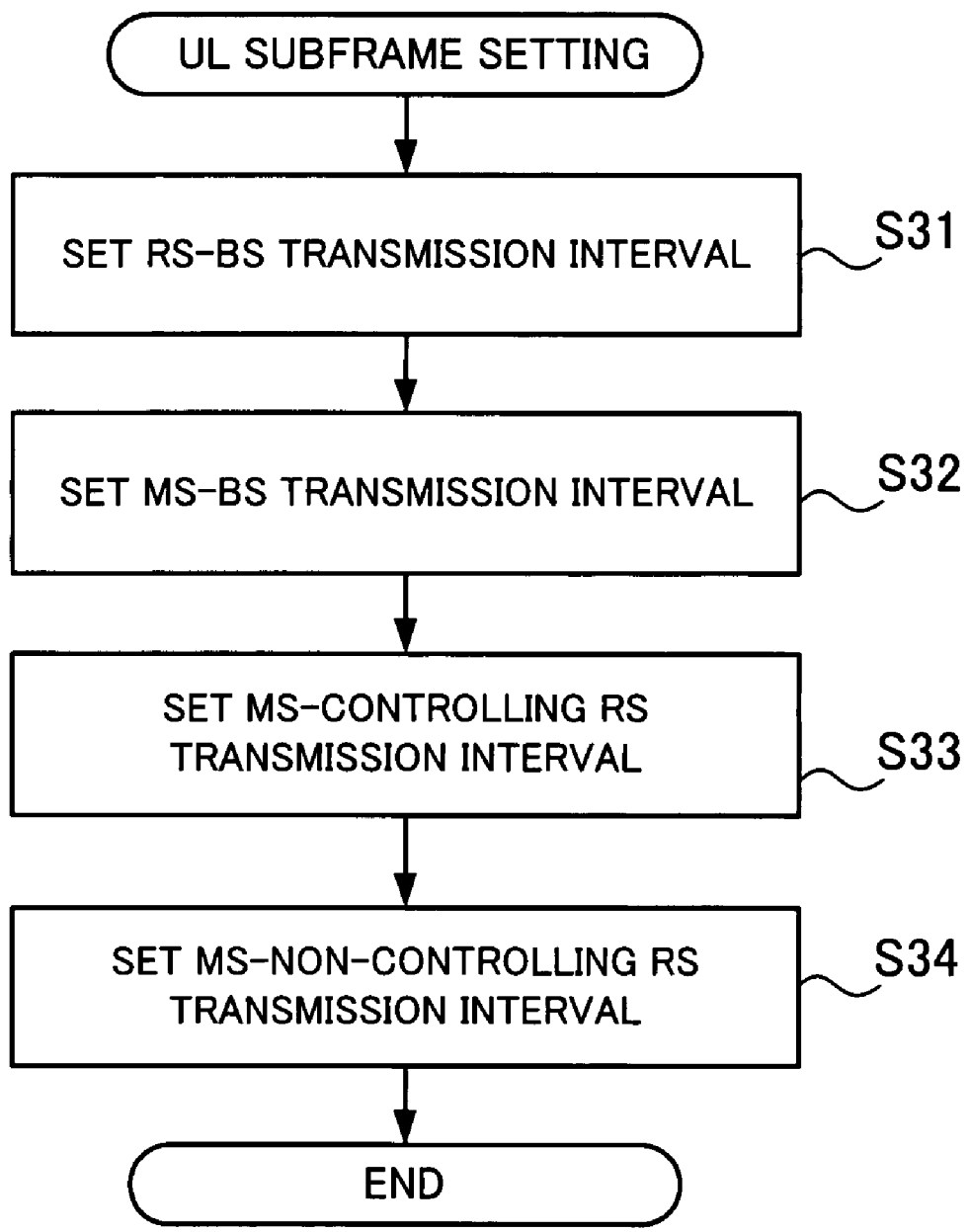
FIG. 10 illustrates the flow of setting an uplink subframe.

FIG. 10 illustrates the flow of setting the uplink subframe. The uplink subframe has four intervals set by the steps explained below.

Step S31: The base station 11 sets an interval for transmitting data from the relay stations 21 and 22 to the base station 11.

Step S32: The base station 11 sets an interval for transmitting data from the mobile station 31 to the base station 11.

Step S33: The base station 11 sets an interval for transmitting data from the mobile station 33 to the controlling relay station 22.

The frame timing of the mobile station 33 communicating with the controlling relay station 22 is different from that of the base station 11. Thus, if the interval for transmitting data from the mobile station 33 to the controlling relay station 22 overlaps with the downlink subframe period of the base station 11, the signal transmitted from the mobile station 33 interferes with the receiving operation of the mobile station 31 communicating with the base station 11 or the receiving operation of the mobile station 32 communicating with the non-controlling relay station 21.

To avoid such interference, the base station 11 sets the data transmission interval of the mobile station 33 communicating with the relay station 22 so as to fall within the uplink subframe period of the base station 11.

Step S34: The base station 11 sets an interval for transmitting data from the mobile station 32 to the non-controlling relay station 21.

The intervals set in the above steps should appear in the mentioned order from the starting time of the uplink subframe. However, the intervals set in Steps S33 and S34 may be reversed in order.

The following describes the frame made up of the aforementioned intervals.

Figure 11:
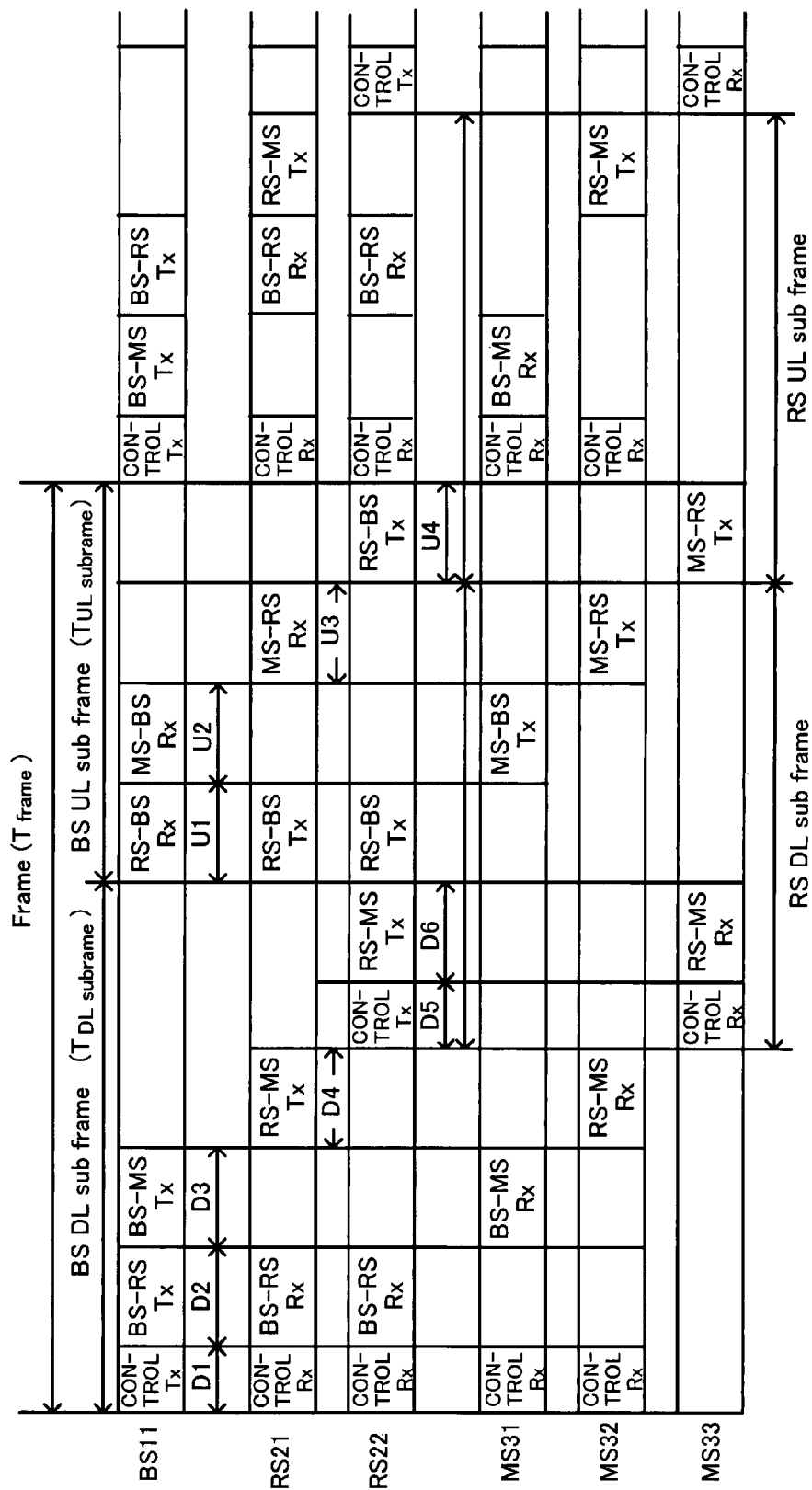
FIG. 11 illustrates a frame format.

FIG. 11 illustrates the format of the frame. As illustrated, the control information is broadcast at time 0 (at the beginning of the frame) from the base station 11 and received by the relay stations 21 and 22 and the mobile stations 31 and 32.

During the period D2 after a lapse of the control information broadcasting period D1, data is transmitted from the base station 11 to the relay stations 21 and 22. At this time, the data transmission to the relay stations 21 and 22 may be implemented using any of time-division multiplexing, subchannel-division multiplexing, code-division multiplexing and space-division multiplexing; however, it is necessary that the signals should be separable at the relay stations 21 and 22.

Then, during the period D3 subsequent to the period (D1+D2), data is transmitted from the base station 11 to the mobile station 31.

Subsequently, during the period D4 following the period (D1+D2+D3), data is transmitted from the relay station 21 to the mobile station 32. Since the relay station 21 does not transmit control information, the relay station 21 and the mobile station 32 are previously notified by the control information from the base station 11 that data is to be transmitted from the relay station 21 to the mobile station 32 during this period.

During the period D5 subsequent to the period (D1+D2+D3+D4), control information is broadcast from the relay station 22. On receiving the control information from the relay station 22, the mobile station 33 recognizes the frame timing of the relay station 22. Also, after connected to the relay station 22, the mobile station 33 learns the transmission/reception timing and period from the control information received from the relay station 22.

Then, during the period D6 subsequent to the period (D1+D2+D3+D4+D5), data is transmitted from the relay station 22 to the mobile station 33. On completion of the data transmission, the downlink subframe ends and the uplink subframe starts according to the frame timing of the base station 11.

The relay stations 21 and 22 and the mobile stations 31 and 32 are previously notified of the uplink subframe start timing by means of the control information from the base station 11, and transmit data to the base station 11 or the relay station 21, 22 on the basis of the uplink subframe start timing and the respective transmission timings and periods specified by the control information from the base station 11. It is assumed here that the downlink subframe period of the base station 11 is $T_{DLsubframe}$. During the period U1 after a lapse of the period $T_{DLsubframe}$, data is transmitted from the relay stations 21 and 22 to the base station 11. At this time, the data transmission from the relay stations 21 and 22 to the base station may be implemented by any of time-division multiplexing, subchannel-division multiplexing, code-division multiplexing and space-division multiplexing; however, it is necessary that the signals be separable at the base station 11.

Then, during the period U2 subsequent to the period ($T_{DLsubframe}$+U1), data is transmitted from the mobile station 31 to the base station 11.

Subsequently, during the period U3 following the period ($T_{DLsubframe}$+U1+U2), data is transmitted from the mobile station 32 to the relay station 21.

During the period U4 subsequent to the period ($T_{DLsubframe}$+U1+U2+U3), data is transmitted from the mobile station 33 to the relay station 22. The transmission interval of the mobile station 33 communicating with the controlling relay station 22 is specified by the control information received from the relay station 22. The process described above completes the data transmission and reception corresponding to one frame.

The relay stations require a certain period of time to switch between the transmission and reception modes and are unable to transmit or receive data during the switching time. By setting the transmission intervals in the aforementioned manner, however, it is possible to minimize the number of times the relay stations 21 and 22 are switched between the transmission and reception modes within one frame.

For example, in FIG. 8, the mode of the relay station 21 is switched four times, as reception→reception→ transmission→reception→transmission→reception, by the time the next frame starts. In FIG. 11, on the other hand, the mode of the relay station 21 switched only twice, as reception→reception→transmission→transmission→reception→reception. Namely, by setting the first interval of the uplink subframe of the base station 11 as the interval for transmitting data from the relay stations 21 and 22 to the base station, it is possible to lessen the number of times the switching must be executed.

In the downlink subframe, the relay stations 21 and 22 end up with data transmission, and this is because the relay stations 21 and 22 first receive data from the base station 11 and then transmit the received data to the mobile stations 32 and 33. For example, in FIG. 11, the relay stations 21 and 22 end up with the data transmissions in D4 and D6, respectively.

Also, according to the second embodiment, each relay station is switched from the transmission mode to the reception mode or vice versa with a time period provided therebetween to allow other relay station to perform data transmission. Accordingly, the mode switching can be executed during this time period, making it possible to eliminate the time for which the data transmission/reception is suspended due to the delay in switching.

A third embodiment of the present invention will be now described in detail with reference to the drawings. Some mobile stations can receive control information only from the base station or only from the controlling relay station, depending on their location. For example, the mobile station 33 shown in FIG. 2 can receive control information from the relay station 22 but not from the base station 11. The mobile station 31 can receive control information from the base station 11 but not from the relay station 22. In the third embodiment, the intervals for transmitting data to such mobile stations are set so as to overlap each other with the same resource allocated, thereby making good use of the resources. In the following, explanation will be made with reference to the communication system shown in FIG. 2.

Figure 12:
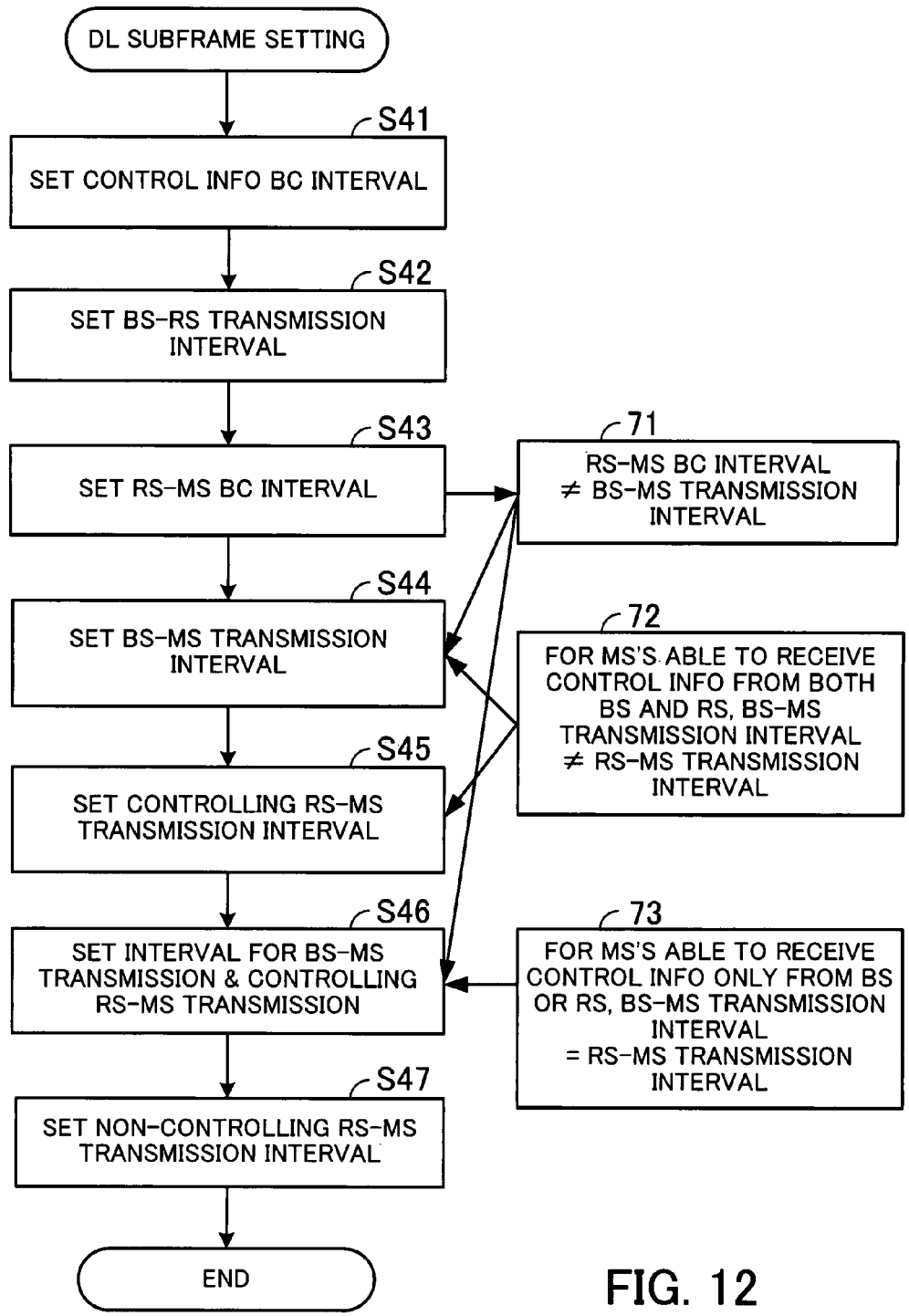
FIG. 12 illustrates the flow of setting a downlink subframe according to a third embodiment.

FIG. 12 illustrates the flow of setting the downlink subframe according to the third embodiment. The downlink subframe has seven intervals set by the steps explained below.

Step S41: The base station 11 sets an interval for broadcasting (in FIG. 12, "BC") control information to the relay stations 21 and 22 and the mobile stations 31 and 32. In order to enter the network, the relay stations 21 and 22 and the mobile stations 31 and 32 receive the control information from the base station 11 and detect the frame timing. Accordingly, the control information needs to be transmitted at the beginning of the frame.

Step S42: The base station 11 sets an interval for transmitting data to the relay stations 21 and 22.

Step S43: The base station 11 sets an interval for broadcasting control information from the controlling relay station 22 to the mobile station 33 communicating therewith. On receiving the control information from the relay station 22, the mobile station 33 recognizes the time of reception of the control information as the beginning of the frame, thereby detecting the frame timing.

Step S44: The base station 11 sets an interval for transmitting data to that mobile station which is communicating with the base station 11, among those (not shown in FIG. 2) located in an area where the control information from both the base station 11 and the controlling relay station 22 can reach.

Step S45: The base station 11 sets an interval for transmitting data to that mobile station which is communicating with the controlling relay station 22, among those (not shown in FIG. 2) located in an area where the control information from both the base station 11 and the controlling relay station 22 can reach.

Step S46: The base station 11 sets an interval for transmitting data from the base station 11 and the controlling relay station 22 respectively to the mobile stations 31 and 33 which are each located in an area where the control information of the base station 11 only or the control information of the relay station 22 only can reach. The base station 11 and the relay station 22 may use the same resource to transmit data.

Step S47: The base station 11 sets an interval for transmitting data from the non-controlling relay station 21 to the mobile station 32 communicating therewith.

As indicated in box 71, the base station 11 does not transmit data during the interval in which the controlling relay station 22 broadcasts control information. Accordingly, the base station 11 transmits data during the intervals set in Steps S44 and S46.

Also, as indicated in box 72, different transmission intervals are set for those mobile stations which are located in an area where the control information from both the base station 11 and the controlling relay station 22 can reach. Namely, for such mobile stations, different transmission intervals are set in Steps S44 and S45. If data is transmitted to such mobile stations during the same interval, signal interference is caused.

Further, as indicated in box 73, an identical transmission interval is set for the mobile stations 31 and 33 which can receive control information from only one of the base station 11 and the controlling relay station 22 (Step S46).

The intervals set in the aforementioned steps may appear in any order within the downlink subframe, except that the interval set in Step S41 should come first and that the intervals set in Steps S44 to S46 should follow the interval set in Step S43. To minimize the number of times the relay stations are switched between the transmission and reception modes within one frame, however, the intervals should be arranged in the mentioned order within the downlink subframe. In this case, the order of the intervals set in Steps S43 to S45 is not particularly limited.

In Steps S44 and S45, different transmission intervals are set depending on whether data is transmitted from the base station 11 or the controlling relay station 22. This makes it possible to avoid signal interference.

Also, in Step S46, an identical transmission interval is set to transmit data from the base station 11 and the controlling relay station 22, thus permitting effective use of the resources. In this case, no interference is caused because the signal from the controlling relay station 22 does not reach the mobile station 31 communicating with the base station 11 and also the signal from the base station 11 does not reach the mobile station 33 communicating with the controlling relay station 22.

Figure 13:
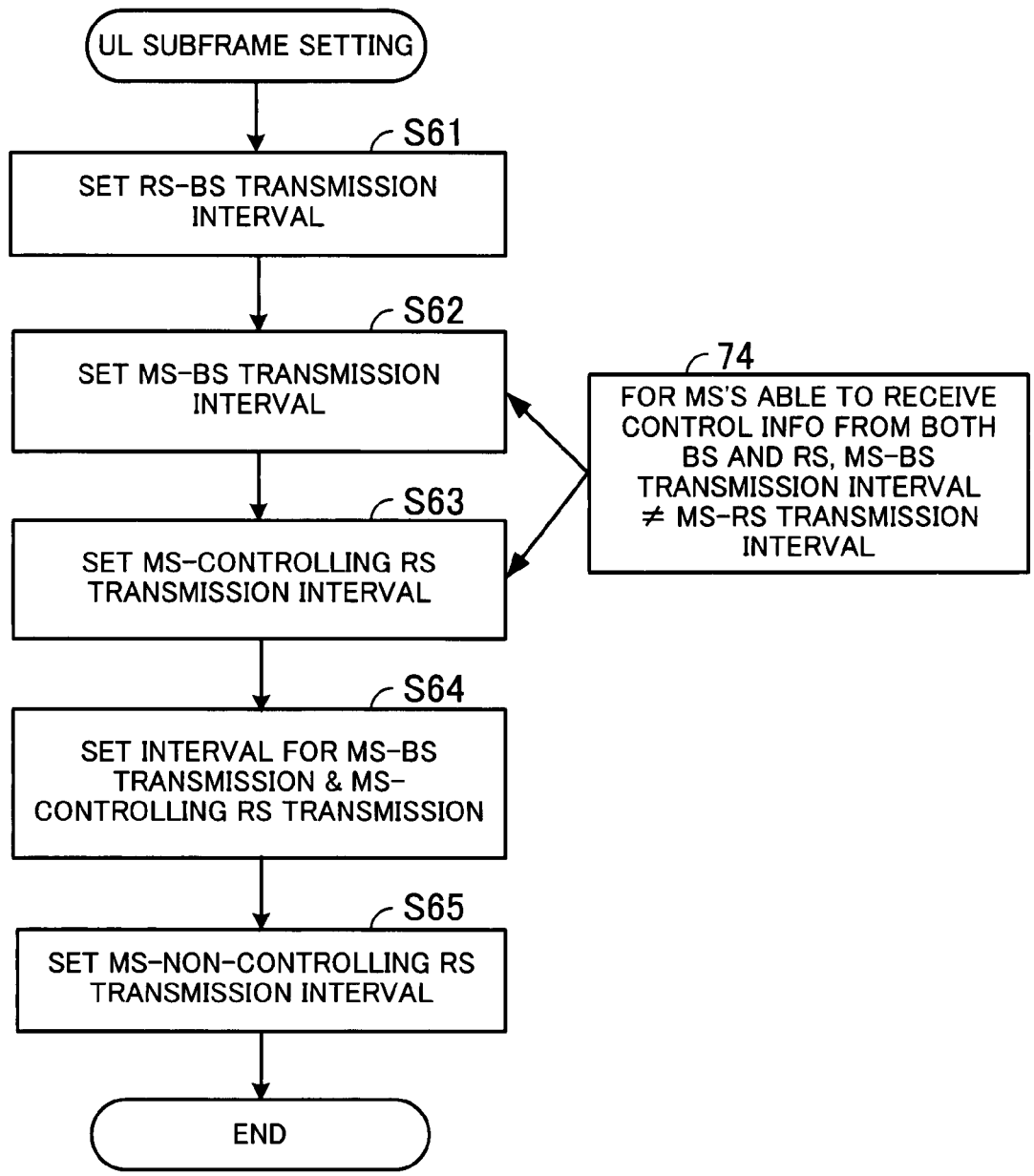
FIG. 13 illustrates the flow of setting an uplink subframe.

FIG. 13 illustrates the flow of setting the uplink subframe. The uplink subframe has five intervals set by the steps explained below.

Step S61: The base station 11 sets an interval for transmitting data from the relay stations 21 and 22 to the base station 11.

Step S62: The base station 11 sets an interval for transmitting data from that mobile station which is communicating with the base station 11, among those located in an area where the control information from both the base station 11 and the controlling relay station 22 can reach, to the base station 11.

Step S63: The base station 11 sets an interval for transmitting data from that mobile station which is communicating with the controlling relay station 22, among those located in an area where the control information from both the base station 11 and the controlling relay station 22 can reach, to the relay station 22.

Step S64: The base station 11 sets an interval for transmitting data from the mobile stations 31 and 33, which can receive control information from only one of the base station 11 and the controlling relay station 22, to the base station 11 and the relay station 22, respectively. The mobile stations 31 and 33, which transmit data to the base station 11 and the relay station 22, respectively, may use the same resource.

Step S65: The base station 11 sets an interval for transmitting data from the mobile station 32 to the non-controlling relay station 21.

As indicated in box 74, different transmission intervals are set for those mobile stations which can receive control information from both the base station 11 and the controlling relay station 22 but are communicating with the different stations. Namely, for such mobile stations, different transmission intervals are set in Steps S62 and S63. If the same transmission interval is set for such mobile stations, interference is caused.

The intervals set in the aforementioned steps may appear in any order within the uplink subframe. To minimize the number of times the relay stations are switched between the transmission and reception modes within one frame, however, the intervals should be arranged in the order mentioned.

The following describes the frame made up of the aforementioned intervals.

Figure 14:
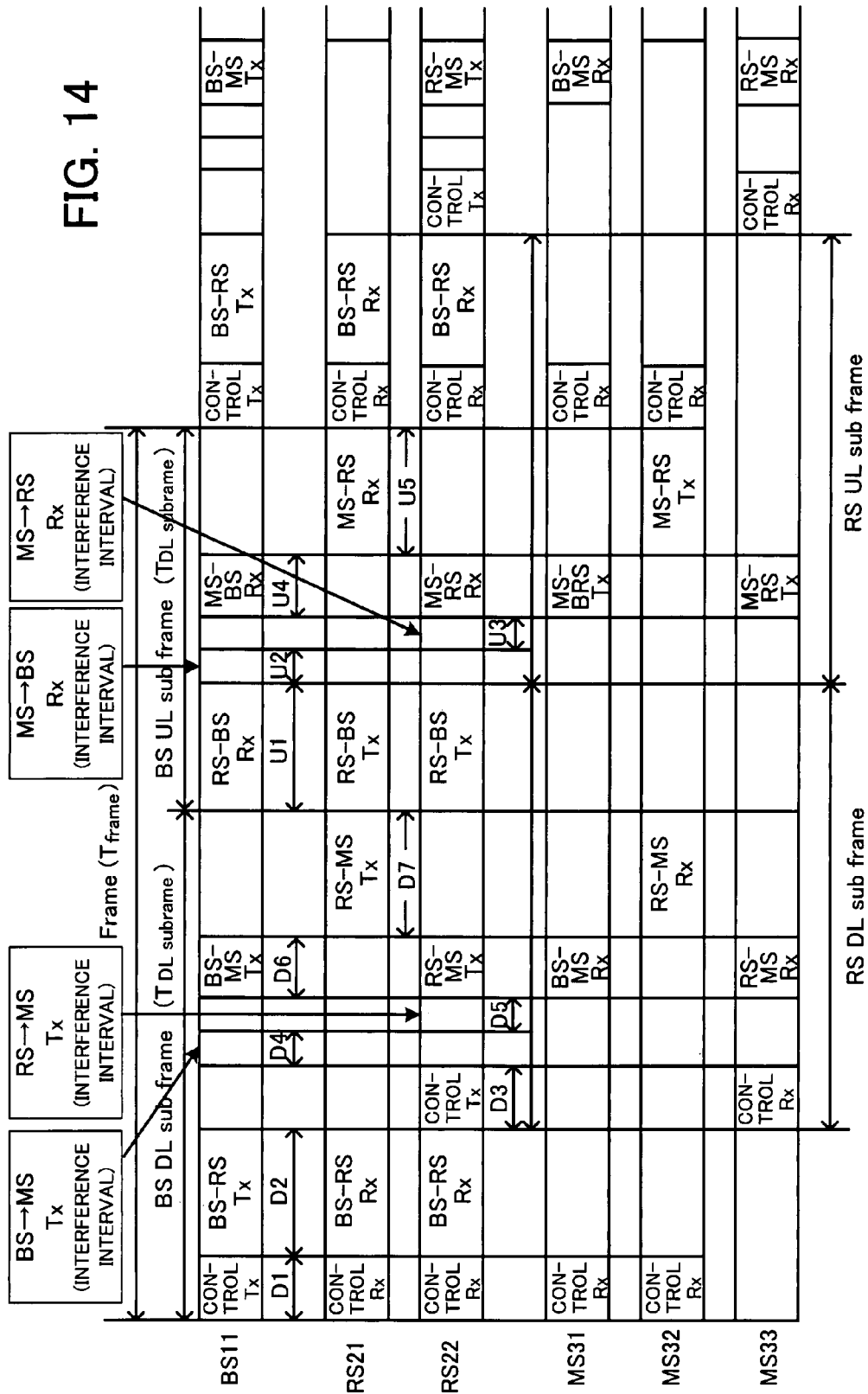
FIG. 14 illustrates a frame format.

FIG. 14 illustrates the format of the frame. As illustrated, the control information is broadcast at time 0 (at the beginning of the frame) from the base station 11 and received by the relay stations 21 and 22 and the mobile stations 31 and 32.

During the period D2 after a lapse of the control information broadcasting period D1, data is transmitted from the base station 11 to the relay stations 21 and 22. At this time, the data transmission to the relay stations 21 and 22 may be implemented using any of time-division multiplexing, subchannel-division multiplexing, code-division multiplexing and space-division multiplexing; however, it is necessary that the signals should be separable at the relay stations 21 and 22.

Then, during the period D3 subsequent to the period (D1+D2), control information is broadcast from the relay station 22 and received by the mobile station 33.

Subsequently, during the period D4 following the period (D1+D2+D3), data is transmitted from the base station 11 to that mobile station which is communicating with the base station 11, among those located in an area where the control information from both the base station 11 and the relay station 22 can reach. FIG. 14 shows "BS→MS Tx" but not "BS-MS Rx" corresponding thereto. This is because the data receiving mobile station is not shown in FIG. 2.

During the period D5 subsequent to the period (D1+D2+D3+D4), data is transmitted from the relay station 22 to that mobile station which is communicating with the relay station 22, among those located in an area where the control information from both the base station 11 and the relay station 22 can reach.

Then, during the period D6 subsequent to the period (D1+D2+D3+D4+D5), data is transmitted from the base station 11 to the mobile station 31, which can receive control information only from the base station 11, and also from the relay station 22 to the mobile station 33, which can receive control information only from the relay station 22. At this time, the base station 11 and the relay station 22 may use the same resource for the data transmission.

Subsequently, during the last period D7 of the downlink subframe that follows the period (D1+D2+D3+D4+D5+D6), data is transmitted from the relay station 21 to the mobile station 32. Since the relay station 21 does not transmit control information, the relay station 21 and the mobile station 32 are previously notified by the control information from the base station 11 that data is to be transmitted from the relay station 21 to the mobile station 32 during this period. On completion of the data transmission, the downlink subframe ends and the uplink subframe starts according to the frame timing of the base station 11.

The relay stations 21 and 22 and the mobile stations 31 and 32 are previously notified of the uplink subframe start timing by means of the control information from the base station 11, and transmit data to the base station 11 or the relay station 21, 22 on the basis of the uplink subframe start timing and the respective transmission timings and periods specified by the control information from the base station 11. It is assumed here that the downlink subframe period of the base station 11 is $T_{DLsubframe}$. During the period U1 after a lapse of the period $T_{DLsubframe}$, data is transmitted from the relay stations 21 and 22 to the base station 11. At this time, the data transmission from the relay stations 21 and 22 to the base station may be implemented by any of time-division multiplexing, subchannel-division multiplexing, code-division multiplexing and space-division multiplexing; however, it is necessary that the signals be separable at the base station 11.

Then, during the period U2 subsequent to the period ($T_{DLsubframe}$+U1), data is transmitted from that mobile station which is communicating with the base station 11, among those located in an area where the control information from both the base station 11 and the relay station 22 can reach, to the base station 11. FIG. 14 shows "MS→BS Rx" but not "MS-BS Tx" corresponding thereto. This is because the data transmitting mobile station is not shown in FIG. 2.

Subsequently, during the period U3 following the period ($T_{DLsubframe}$+U1+U2), data is transmitted from that mobile station which is communicating with the relay station 22, among those located in an area where the control information from both the base station 11 and the relay station 22 can reach, to the relay station 22.

During the period U4 subsequent to the period ($T_{DLsubframe}$+U1+U2+U3), data is transmitted from the mobile station 31, which can receive control information only from the base station 11, to the base station 11, and also from the mobile station 33, which can receive control information only from the relay station 22, to the relay station 22. At this time, the mobile stations 31 and 33 may use the same resource for the data transmission.

Then, during the period U5 subsequent to the period ($T_{DLsubframe}$+U1+U2+U3+U4), data is transmitted from the mobile station 32 to the relay station 21. The process described above completes the data transmission and reception corresponding to one frame.

During the intervals (in FIG. 14, D6 and U4) in which the same resource is used to transmit/receive data to/from the mobile stations 31 and 33, no interference is caused because the control information that the mobile station 31 can receive does not reach the mobile station 33 and vice versa. It is therefore possible to make good use of the resources.

A fourth embodiment of the present invention will be now described in detail with reference to the drawings. In the fourth embodiment, signal interference is measured at the mobile stations in terms of SINR, for example. Then, in accordance with the measured interference, the interval for transmitting data to the mobile station 31 communicating directly with the base station 11, the interval for transmitting data to the mobile station 32 communicating with the relay station 21 and the interval for transmitting data to the mobile station 33 communicating with the relay station 22 are set so as to overlap one another. In the following, explanation will be made with reference to the communication system shown in FIG. 2.

Figure 15:
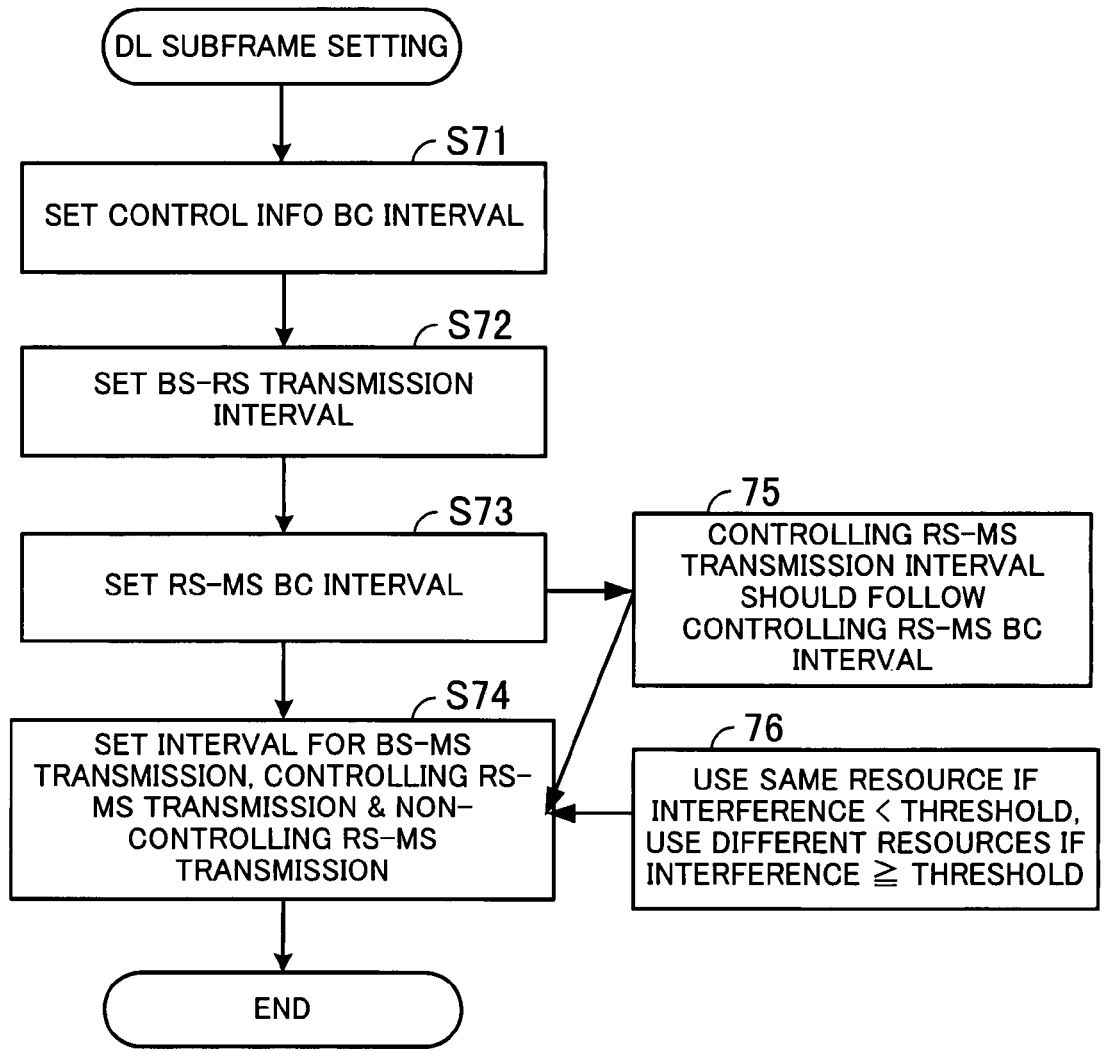
FIG. 15 illustrates the flow of setting a downlink subframe according to a fourth embodiment.

FIG. 15 illustrates the flow of setting the downlink subframe according to the fourth embodiment. The downlink subframe has four intervals set by the steps explained below.

Step S71: The base station 11 sets an interval for broadcasting (in FIG. 15, "BC") control information to the relay stations 21 and 22 and the mobile stations 31 and 32. In order to enter the network, the relay stations 21 and 22 and the mobile stations 31 and 32 receive the control information from the base station 11 and detect the frame timing. Accordingly, the control information needs to be transmitted at the beginning of the frame.

Step S72: The base station 11 sets an interval for transmitting data therefrom to the relay stations 21 and 22.

Step S73: The base station 11 sets an interval for broadcasting control information from the controlling relay station 22 to the mobile station 33 communicating therewith. On receiving the control information from the relay station 22, the mobile station 33 recognizes the time of reception of the control information as the beginning of the frame, thereby detecting the frame timing.

Step S74: The base station 11 sets an interval for transmitting data therefrom to the mobile station 31, from the controlling relay station 22 to the mobile station 33 communicating therewith, and from the non-controlling relay station 21 to the mobile station 32 communicating therewith.

At this time, the interval for transmitting data from the controlling relay station 22 to the mobile station 33 communicating therewith is set so as to follow the interval set in Step S73, as indicated in box 75.

Also, as indicted in box 76, the base station 11 and the relay stations 21 and 22 use the same resource when the interference at the mobile stations is lower than a threshold, and use different resources when the interference is higher than or equal to the threshold.

Among the aforementioned intervals, the interval set in Step S73 may be set as part of the interval set in Step S74. Also, on condition that the interval set in Step S71 comes first, the interval set in Step S72 and the intervals set in Steps S73 and S74 may be reversed in order within the downlink subframe. To minimize the number of times the relay stations are switched between the transmission and reception modes within one frame, however, the intervals should be arranged in the mentioned order within the downlink subframe.

Figure 16:
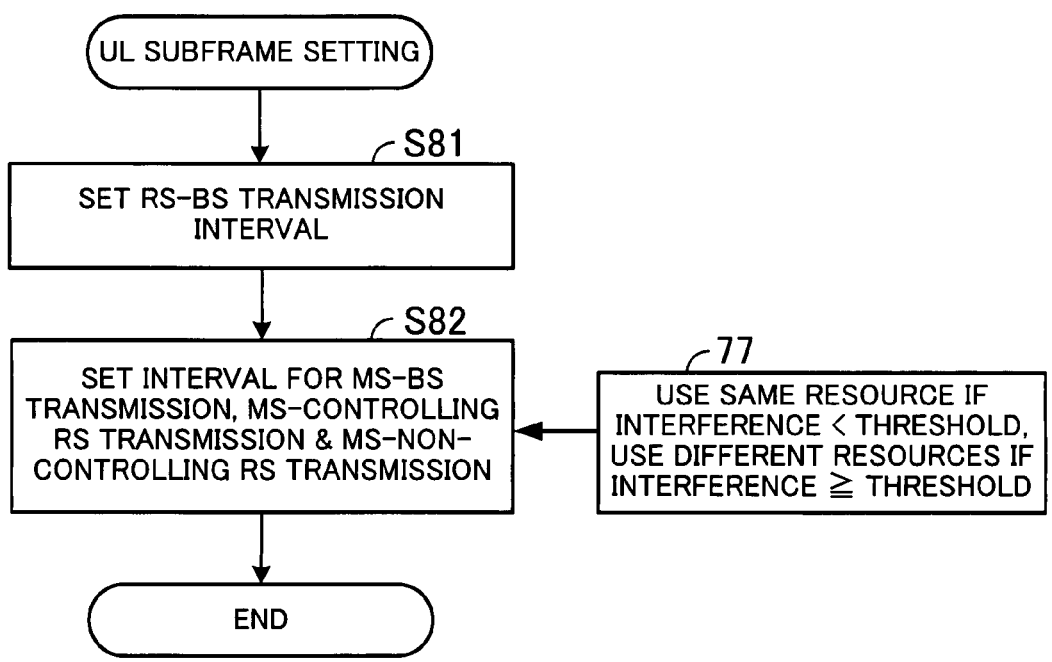
FIG. 16 illustrates the flow of setting an uplink subframe.

FIG. 16 illustrates the flow of setting the uplink subframe. The uplink subframe has two intervals set by the steps explained below.

Step S81: The base station 11 sets an interval for transmitting data from the relay stations 21 and 22 to the base station 11.

Step S82: The base station 11 sets an interval for transmitting data from the mobile station 31 to the base station 11, from the mobile station 33 to the controlling relay station 22, and from the mobile station 32 to the non-controlling relay station 21. At this time, as indicted in box 77, the mobile stations 31 to 33 use the same resource when the interference at the base station 11 and the relay stations 21 and 22 is lower than a threshold, and use different resources when the interference is higher than or equal to the threshold.

The intervals set in the above steps may be reversed in order within the uplink subframe. To minimize the number of times the relay stations are switched between the transmission and reception modes within one frame, however, the intervals should be arranged in the order mentioned.

The following describes the frame made up of the aforementioned intervals.

Figure 17:
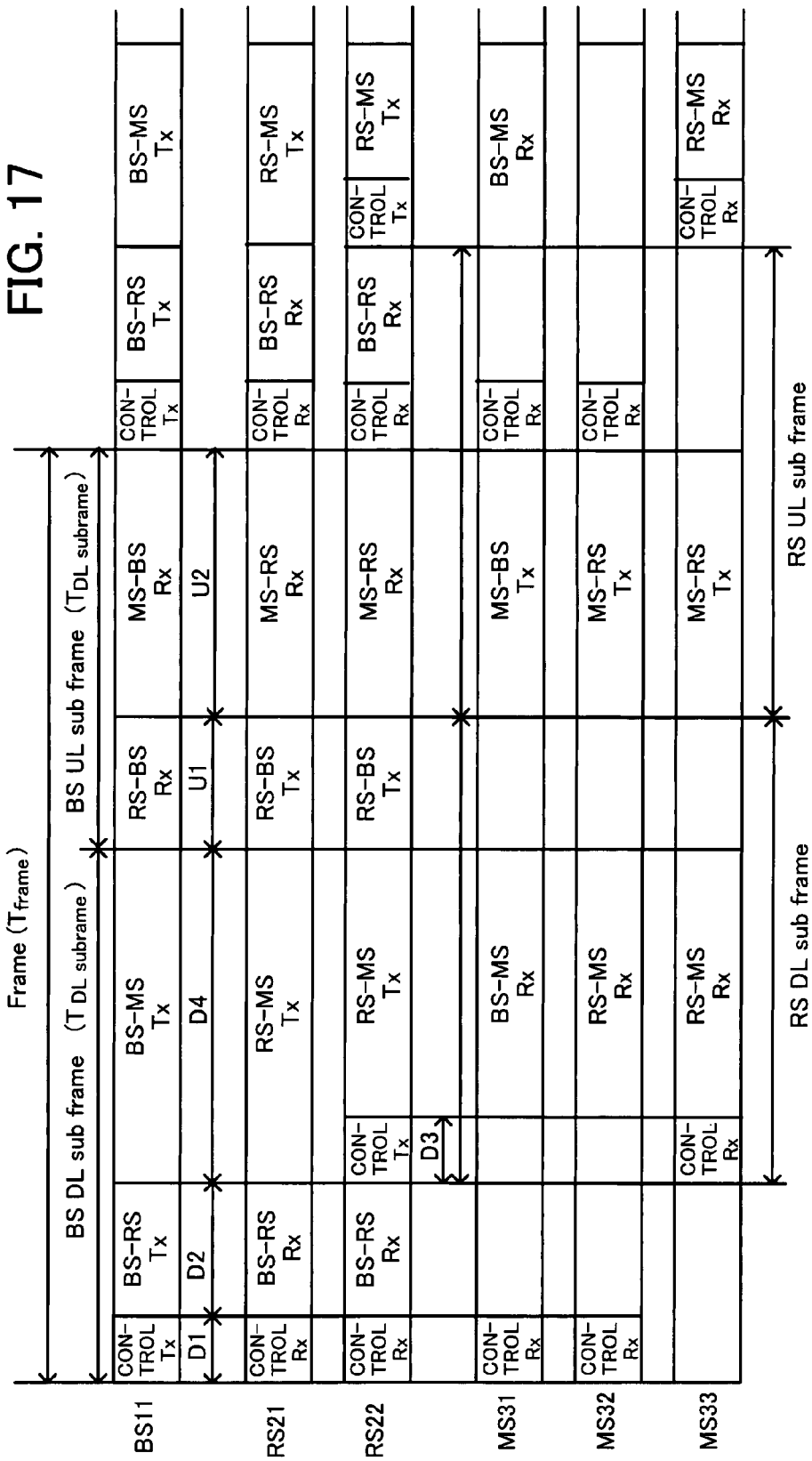
FIG. 17 illustrates a frame format.
Figure 18:
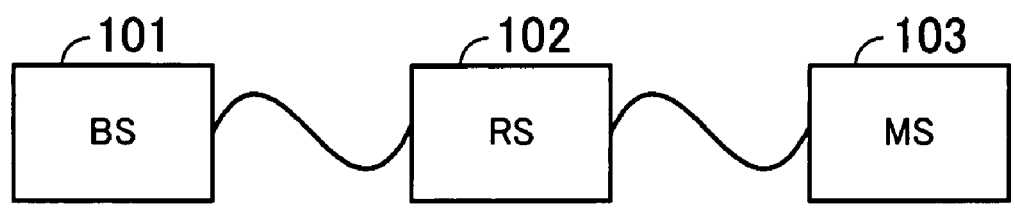
FIG. 18 illustrates a wireless communication system for performing wireless relay communication.
Figure 19:
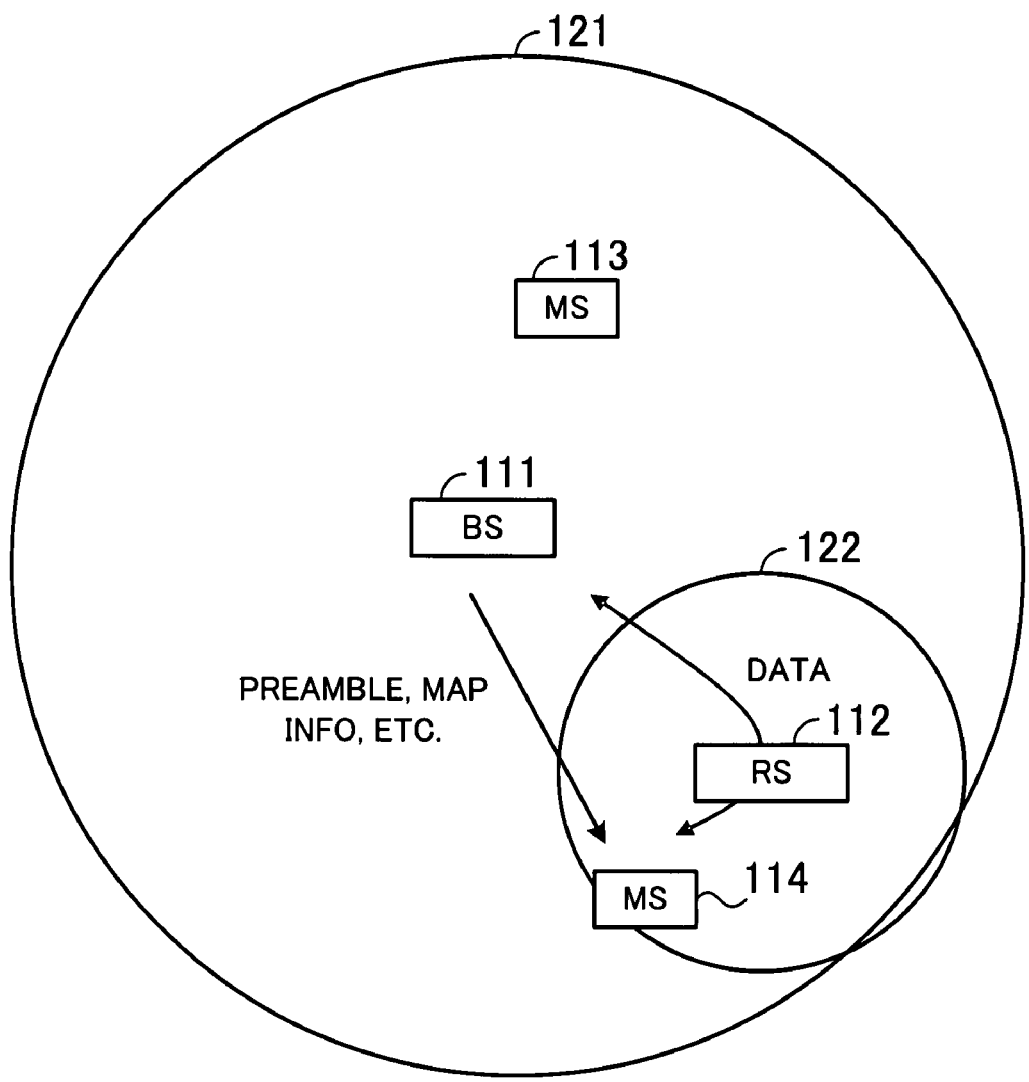
FIG. 19 illustrates a first type of communication system.
Figure 20:
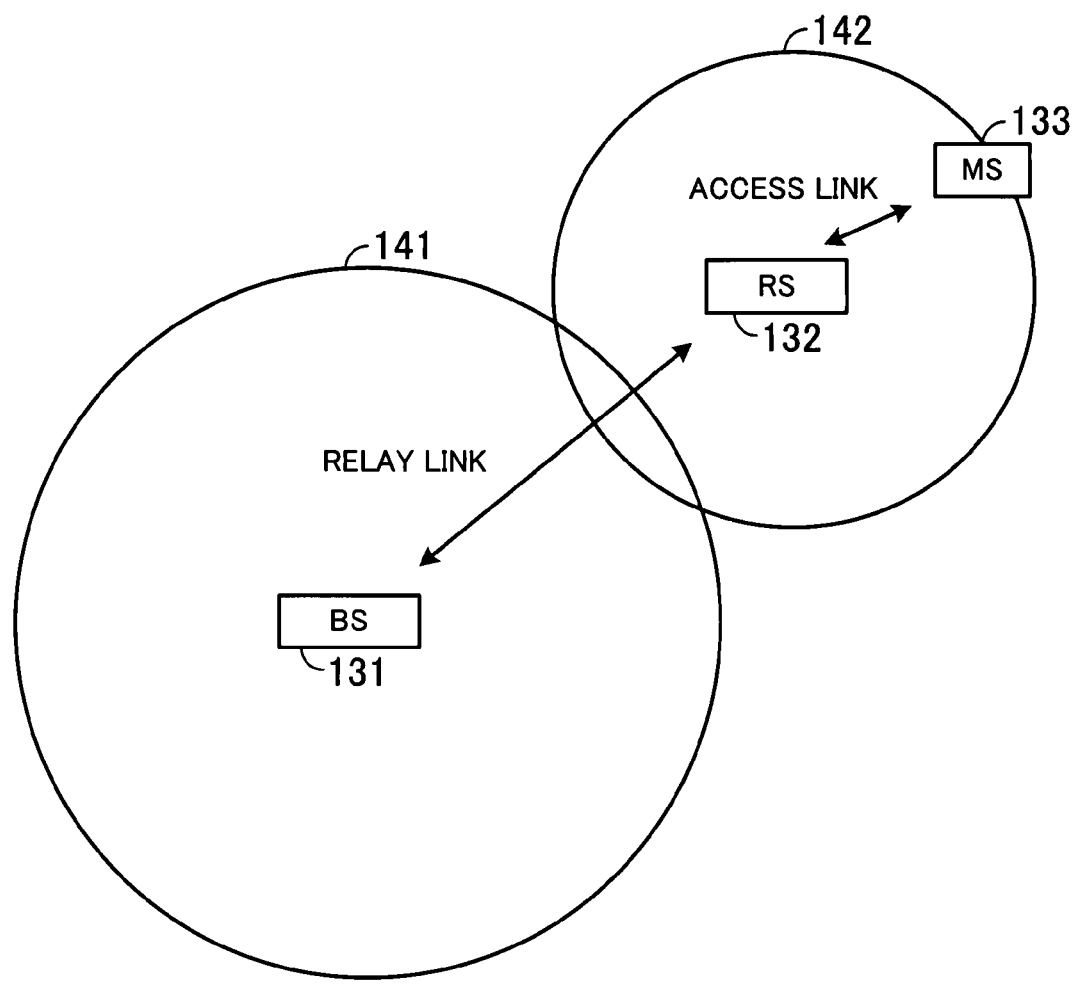
FIG. 20 illustrates a second type of communication system.

FIG. 17 illustrates the format of the frame. As illustrated, the control information is broadcast at time 0 (at the beginning of the frame) from the base station 11 and received by the relay stations 21 and 22 and the mobile stations 31 and 32.

During the period D2 after a lapse of the control information broadcasting period D1, data is transmitted from the base station 11 to the relay stations 21 and 22. At this time, the data transmission to the relay stations 21 and 22 may be implemented using any of time-division multiplexing, subchannel-division multiplexing, code-division multiplexing and space-division multiplexing; however, it is necessary that the signals should be separable at the relay stations 21 and 22.

Then, during the period D3 subsequent to the period (D1+ D2), control information is broadcast from the relay station 22 and received by the mobile station 33.

Also, during the period D4 that follows the period (D1+ D2), data is transmitted from the base station 11 and the relay stations 21 and 22 to the mobile stations 31 to 33 communicating respectively therewith. At this time, however, the transmission interval of the relay station 22 starts after a lapse of the period (D1+D2+D3). Also, the base station 11 and the relay stations 21 and 22 use the same resource when the expected interference at the individual mobile stations 31 to 33 is lower than the threshold, and use different resources when the interference is higher than or equal to the threshold. On completion of the data transmission, the downlink subframe ends and the uplink subframe starts according to the frame timing of the base station 11.

The relay stations 21 and 22 and the mobile stations 31 and 32 are previously notified of the uplink subframe start timing by means of the control information from the base station 11, and transmit data to the base station 11 or the relay station 21, 22 on the basis of the uplink subframe start timing and the respective transmission timings and periods specified by the control information from the base station 11. Let the downlink subframe period of the base station 11 be $T_{DLsubframe}$. During the period U1 after a lapse of the period $T_{DLsubframe}$, data is transmitted from the relay stations 21 and 22 to the base station 11. At this time, the data transmission from the relay stations 21 and 22 to the base station may be implemented by any of time-division multiplexing, subchannel-division multiplexing, code-division multiplexing and space-division multiplexing; however, it is necessary that the signals be separable at the base station 11.

Then, during the period U2 subsequent to the period ($T_{DLsubframe}$+U1), data is transmitted from the mobile station 31 to the base station 11, from the mobile station 32 to the relay station 21, and from the mobile station 33 to the relay station 22. The mobile stations 31 to 33 use the same resource if the expected interference at each of the base station 11 and the relay stations 21 and 22 is lower than the threshold, and use different resources if the interference is higher than or equal to the threshold. The process described above completes the data transmission and reception corresponding to one frame.

Thus, in cases where the signal interference is low, the same resource is used, making it possible to effectively use the resources.

In the wireless communication device of the present invention, the interval for transmitting data from the controlling relay station to a terminal communicating therewith is set so as to fall within the downlink subframe of the frame. This eliminates the situation where, while the terminal communicating with the controlling relay station is receiving data, another terminal communicating with a non-controlling relay station transmits data, thereby preventing the terminals from interfering with each other's communications.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication device for performing wireless communication, comprising:
transmission interval setting means for setting, in a downlink subframe of a frame for communicating by wireless with each of a terminal, a non-controlling relay station configured to transmit data only and a controlling relay station configured to transmit both data and control information, an interval for transmitting data from the controlling relay station to a terminal communicating therewith.

2. The wireless communication device according to claim 1, further comprising uplink transmission interval setting means for setting, in an uplink subframe of the frame, an interval for transmitting data from the terminal communicating with the controlling relay station to the controlling relay station.

3. The wireless communication device according to claim 1, further comprising relay data transmission interval setting means for setting, at the beginning of an uplink subframe of the frame, an interval for transmitting data from the controlling relay station and the non-controlling relay station to the wireless communication device.

4. The wireless communication device according to claim 1, further comprising relay interval setting means for setting data transmission and reception intervals of each of the controlling relay station and the non-controlling relay station such that the data transmission and reception intervals are separated from each other within the frame.

5. The wireless communication device according to claim 1, further comprising:
first overlap interval setting means for setting an interval for transmitting data from the wireless communication device to a terminal located in a first area where only the control information of the wireless communication device can reach, and an interval for transmitting data from the controlling relay station to a terminal located in a second area where only the control information of the controlling relay station can reach, such that the two intervals overlap each other; and
second overlap interval setting means for setting an interval for transmitting data from the terminal located in the first area to the wireless communication device and an interval for transmitting data from the terminal located in the second area to the controlling relay station such that the two intervals overlap each other.

6. The wireless communication device according to claim 1, further comprising:
first threshold-dependent overlap interval setting means for setting, if interference with wireless communication is lower than a threshold value, an interval for transmitting data from the wireless communication device to a first terminal communicating directly therewith, an interval for transmitting data from the controlling relay station to a second terminal communicating therewith, and an interval for transmitting data from the non-controlling relay station to a third terminal communicating therewith such that the three intervals overlap one another; and
second threshold-dependent overlap interval setting means for setting, if the interference with wireless communication is lower than the threshold value, an interval for transmitting data from the first terminal to the wireless communication device, an interval for transmitting data from the second terminal to the controlling relay station, and an interval for transmitting data from the third terminal to the non-controlling relay station such that the three intervals overlap one another.

7. The wireless communication device according to claim 1, wherein the frame comprises the downlink subframe and an uplink subframe following the downlink subframe.

8. The wireless communication device according to claim 1, further comprising control information transmission interval setting means for setting, at the beginning of the frame, an interval for transmitting the control information to the terminal, the non-controlling relay station, and the controlling relay station.

9. The wireless communication device according to claim 1, wherein the control information transmitted from the wireless communication device includes information about intervals set within the frame to allow data to be exchanged with the terminal, the non-controlling relay station and the controlling relay station, and information about the interval set by the transmission interval setting means, and the control information transmitted from the controlling relay station includes information about the interval set by the transmission interval setting means.

10. A wireless communication device for relaying data exchanged between a base station and a terminal and for transmitting control information to the terminal, comprising:

transmission interval setting means for setting an interval for transmitting the control information to the terminal and an interval for transmitting data to the terminal so as to fall within a downlink subframe of a frame by means of which the base station performs wireless communication.

11. The wireless communication device according to claim 10, further comprising uplink transmission interval setting means for setting, in an uplink subframe of the frame, an interval for transmitting data from the terminal communicating with the wireless communication device to the wireless communication device.

12. A wireless communication method for a wireless communication system including a base station, a terminal, a non-controlling relay station configured to transmit data only, and a controlling relay station configured to transmit both data and control information, wherein the base station sets, in a downlink subframe of a frame for performing wireless communication, an interval for transmitting data from the controlling relay station to a terminal communicating therewith.

13. The wireless communication method according to claim 12, wherein the base station sets, in an uplink subframe of the frame, an interval for transmitting data from the terminal communicating with the controlling relay station to the controlling relay station.

* * * * *